(12) United States Patent
Melanson

(10) Patent No.: US 8,587,211 B2
(45) Date of Patent: *Nov. 19, 2013

(54) POWER CONTROL SYSTEM FOR CURRENT REGULATED LIGHT SOURCES

(75) Inventor: John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/473,839

(22) Filed: May 17, 2012

(65) Prior Publication Data

US 2012/0229046 A1    Sep. 13, 2012

Related U.S. Application Data

(63) Continuation of application No. 12/858,004, filed on Aug. 17, 2010, now Pat. No. 8,232,736, which is a continuation of application No. 12/047,262, filed on Mar. 12, 2008, now Pat. No. 7,804,256.

(60) Provisional application No. 60/894,295, filed on Mar. 12, 2007, provisional application No. 60/909,458, filed on Apr. 1, 2007.

(51) Int. Cl.
*H05B 41/16* (2006.01)

(52) U.S. Cl.
USPC ........ 315/247; 315/291; 315/307; 315/185 S; 315/312

(58) Field of Classification Search
USPC .................. 315/247, 291, 307, 312, 185 S
See application file for complete search history.

(56) References Cited

U.S. PATENT DOCUMENTS

| | | | |
|---|---|---|---|
| 7,804,256 B2 * | 9/2010 | Melanson | 315/291 |
| 2005/0218838 A1 | 10/2005 | Lys | |
| 2005/0253533 A1 | 11/2005 | Lys | |

FOREIGN PATENT DOCUMENTS

WO    WO2008112820 A2    9/2008

OTHER PUBLICATIONS

Notice of Allowance mailed on May 17, 2010 in parent U.S. Appl. No. 12/047,262.
Non-Final OA mailed on Oct. 1, 2010 in parent U.S. Appl. No. 12/858,004.
Response to Non-Final OA filed in parent U.S. Appl. No. 12/858,004 on Apr. 1, 2011.
Notice of Non-Compliant Amendment mailed on Apr. 6, 2011 in parent U.S. Appl. No. 12/858,004.
Response to Notice of Non-Compliant Amendment filed in parent U.S. Appl. No. 12/858,004 on May 3, 2011.

(Continued)

*Primary Examiner* — Tuyet Thi Vo
(74) *Attorney, Agent, or Firm* — Terrile, Cannatti, Chambers & Holland, LLP

(57) ABSTRACT

A light emitting diode (LED) lighting system includes a PFC and output voltage controller and a LED lighting power system. The controller advantageously operates from an auxiliary voltage less than a link voltage generated by the LED lighting power system. The common reference voltage allows all the components of lighting system to work together. A power factor correction switch and an LED drive current switch are coupled to the common reference node and have control node-to-common node, absolute voltage that allows the controller to control the conductivity of the switches. The LED lighting system can utilize feed forward control to concurrently modify power demand by the LED lighting power system and power demand of one or more LEDs. The LED lighting system can utilize a common current sense device to provide a common feedback signal to the controller representing current in at least two of the LEDs.

44 Claims, 15 Drawing Sheets

(56) References Cited

OTHER PUBLICATIONS

Final OA mailed on Nov. 10, 2011 in parent U.S. Appl. No. 12/858,004.
Response to Final OA filed in parent U.S. Appl. No. 12/858,004 on Jan. 10, 2012.
Notice of Allowance mailed on Feb. 15, 2012 in parent U.S. Appl. No. 12/858,004.
International Search Report issued in related PCT Application No. PCT/US08/56737 on Nov. 11, 2009.
International Preliminary Report on Patentability and Written Opinion issued in related PCT Application No. PCT/US08/56737 on Nov. 17, 2009.
Communication pursuant to Rules 161 and 162 EPC mailed on Jan. 8, 2010 in the corresponding EP Patent Application No. EP20080743811.
Response to Communication pursuant to Rules 161 and 162 EPC filed with Amended Claims in corresponding EP Patent Application No. EP20080743811 on Feb. 18, 2010.
Communication pursuant to Article 94(3) EPC mailed on Apr. 29, 2010 in the corresponding EP Patent Application No. EP20080743811.
Response to Communication pursuant to Article 94(3) EPC filed with Amended Claims and Description in corresponding EP Patent Application No. EP20080743811 on Feb. 24, 2011.
An English translation of the First Office Action mailed on Sep. 7, 2010 in the corresponding Chinese Patent Application No. 200880008270.X.
Response to First Office Action filed in the corresponding Chinese Patent Application No. 200880008270A on Mar. 16, 2011 (in Chinese).
An English translation of the Second Office Action mailed on Jun. 27, 2011 in the corresponding Chinese Patent Application No. 200880008270.X.
Response to Second Office Action filed in the corresponding Chinese Patent Application No. 200880008270.X on Nov. 11, 2011 (in Chinese).
An English translation of the Third Office Action mailed on Dec. 23, 2011 in the corresponding Chinese Patent Application No. 200880008270.X.
Response to Third Office Action filed in the corresponding Chinese Patent Application No. 200880008270.X on May 7, 2012 (in Chinese).
Balogh, Laszlo: "A Design and Application Guide for High Speed Power MOSFET Gate Drive Circuits" Texas Instruments, Inc., SEM-1400, Unitrode Power Supply Design Seminar, Topic II, TI Literature No. SLUP133, XP002552367, 37 pages.
Zhenyu Yu: "3.3V DSP for Digital Motor Control" Jun. 1999, Texas Instruments—Application Report SPRA550, XP002552366, 19 pages.
International Rectifier: "Data Sheet No. PD60143-0, IR2127(S)/IR2128(S), Current Sensing Single Channel Driver" International Rectifier Data Sheets, Sep. 8, 2004, pp. 1-16, XP002552456.
International Rectifier: "Application Note AN-978 RevD—HV Floating MOS-Gate Driver—ICs" Mar. 23, 2007, XP002552371.
An English translation of the Fourth Office Action mailed on Oct. 24, 2012 in the corresponding Chinese Patent Application No. 200880008270.X.

* cited by examiner

US 8,587,211 B2

POWER CONTROL SYSTEM FOR CURRENT REGULATED LIGHT SOURCES

CROSS REFERENCE TO RELATED APPLICATIONS

This application is a continuation of co-pending application Ser. No. 12/858,004, filed Aug. 17, 2010, which claims the benefit of application Ser. No. 12/047,262, filed Mar. 12, 2008, now U.S. Pat. No. 7,804,256, which claims the benefit of Application No. 60/894,295, filed Mar. 12, 2007, and Application No. 60/909,458, filed Apr. 1, 2007, all of which are incorporated herein by reference in their entireties.

U.S. patent application Ser. No. 12/047,249, entitled "Ballast for Light Emitting Diode Light Sources," inventor John L. Melanson, and filed on Mar. 12, 2008 describes exemplary methods and systems and is incorporated by reference in its entirety.

U.S. patent application Ser. No. 11/926,864, entitled "Color Variations in a Dimmable Lighting Device with Stable Color Temperature Light Sources," inventor John L. Melanson, and filed on Mar. 31, 2007 describes exemplary methods and systems and is incorporated by reference in its entirety.

U.S. Provisional Application No. 60/909,457, entitled "Multi-Function Duty Cycle Modifier," inventors John L. Melanson and John Paulos, and filed on Mar. 31, 2007 describes exemplary methods and systems and is incorporated by reference in its entirety. Referred to herein as Melanson I.

U.S. patent application Ser. No. 12/047,258, entitled "Multi-Function Duty Cycle Modifier," inventors John L. Melanson and John Paulos, and filed on Mar. 12, 2008 describes exemplary methods and systems and is incorporated by reference in its entirety. Referred to herein as Melanson II.

U.S. patent application Ser. No. 11/695,024, entitled "Lighting System with Lighting Dimmer Output Mapping," inventors John L. Melanson and John Paulos, and filed on Mar. 31, 2007 describes exemplary methods and systems and is incorporated by reference in its entirety.

U.S. patent application Ser. No. 11/864,366, entitled "Time-Based Control of a System having Integration Response," inventor John L. Melanson, and filed on Sep. 28, 2007 describes exemplary methods and systems and is incorporated by reference in its entirety. Referred to herein as Melanson III.

U.S. patent application Ser. No. 11/967,269, entitled "Power Control System Using a Nonlinear Delta-Sigma Modulator with Nonlinear Power Conversion Process Modeling," inventor John L. Melanson, and filed on Dec. 31, 2007 describes exemplary methods and systems and is incorporated by reference in its entirety. Referred to herein as Melanson IV.

U.S. patent application Ser. No. 11/967,271, entitled "Power Factor Correction Controller with Feedback Reduction," inventor John L. Melanson, and filed on Dec. 31, 2007 describes exemplary methods and systems and is incorporated by reference in its entirety. Referred to herein as Melanson V.

U.S. patent application Ser. No. 11/967,273, entitled "System and Method with Inductor Flyback Detection Using Switch Date Charge Characteristic Detection," inventor John L. Melanson, and filed on Dec. 31, 2007 describes exemplary methods and systems and is incorporated by reference in its entirety. Referred to herein as Melanson VI.

U.S. patent application Ser. No. 11/967,275, entitled "Programmable Power Control System," inventor John L. Melanson, and filed on Dec. 31, 2007 describes exemplary methods and systems and is incorporated by reference in its entirety. Referred to herein as Melanson VII.

U.S. patent application Ser. No. 11/967,272, entitled "Power Factor Correction Controller With Switch Node Feedback", inventor John L. Melanson, and filed on Dec. 31, 2007 describes exemplary methods and systems and is incorporated by reference in its entirety. Referred to herein as Melanson VIII.

U.S. patent application Ser. No. 12/047,269, entitled "Lighting System with Power Factor Correction Control Data Determined from a Phase Modulated Signal," inventor John L. Melanson, and filed on Mar. 12, 2008 describes exemplary methods and systems and is incorporated by reference in its entirety.

BACKGROUND OF THE INVENTION

1. Field of the Invention

The present invention relates in general to the field of electronics and lighting, and more specifically to a system and method to controlling and/or providing power to current regulated light sources, such as light emitting diode light sources.

2. Description of the Related Art

Commercially practical incandescent light bulbs have been available for over 100 years. However, other light sources show promise as commercially viable alternatives to the incandescent light bulb. LEDs are becoming particularly attractive as main stream light sources in part because of energy savings through high efficiency light output, long life, and environmental incentives such as the reduction of mercury.

LEDs are semiconductor devices and are driven by direct current. The brightness of the LED varies in direct proportion to the current flowing through the LED. Thus, increasing current supplied to an LED increases the brightness of the LED and decreasing current supplied to the LED dims the LED.

FIG. 1 depicts a switching light emitting diode (LED) driver system 100. The LED driver system 100 includes a continuous current mode, buck-based power converter 102 to provide a constant mains voltage $V_{mains}$ to switching LED system 104. Voltage source 101 supplies an alternating current (AC) input mains voltage $V_{mains}$ to a full, diode bridge rectifier 103. The voltage source 101 is, for example, a public utility, and the AC mains voltage $V_{mains}$ is, for example, a 60 Hz/120 V mains voltage in the United States of America or a 50 Hz/230 V mains voltage in Europe. The rectifier 103 rectifies the input mains voltage $V_{mains}$. The hold-up capacitor C1 holds an approximately direct current (DC) supply voltage $V_{C1}$ across capacitor C1 relative to a reference voltage $V_R$. Supply voltage $V_{C1}$ is also the output voltage of power converter 102 and the input voltage for controller 106. Input filter capacitor C2 provides a high pass filter for high frequency components of the output voltage of rectifier 103. A thermistor NTC1 provides in-rush current protection for power converter 102.

The controller 106 is, for example, a Supertex HV9910B integrated circuit controller available from Supertex, Inc. of Sunnyvale, Calif. The supply voltage $V_{C1}$ can vary from, for example, 8V to 450V. Controller 106 incorporates an internal voltage regulator to operate directly from the DC supply voltage $V_C$. The controller 106 provides a gate drive signal from the GATE output node to the n-channel metal oxide semiconductor field effect transistor (MOSFET) Q1. Controller 106 modulates the gate drive signal and, thus, the conductivity of MOSFET Q1 to provide a constant current to switching LED system 104. Controller 106 modifies the average resistance of MOSFET Q1 by varying a duty cycle of a pulse width modulated gate drive signal $V_{GATE}$. Resistor $R_1$ and capacitor $C_3$ provide external connections for controller 106 to the ground reference.

Controller 106 generates and uses feedback to maintain a constant current $i_{LED}$. Controller 106 receives a current feedback signal $V_{fb}$, representing a feedback voltage $V_{fb}$ sensed across sense resistor $R_2$. The feedback voltage $V_{fb}$ is directly proportional to the LED current $i_{LED}$ in LEDs 108. If the feedback voltage $V_{fb}$ exceeds a predetermined reference corresponding to a desired LED current, the controller 106 responds to the feedback voltage $V_{fb}$ by decreasing the duty cycle of gate drive signal GATE to increase the average resistance of MOSFET Q1 over time. If the feedback voltage $V_{fb}$ is less than a predetermined reference corresponding to the desired LED current, the controller 106 responds to the feedback voltage $V_{fb}$ by increasing the duty cycle of gate drive signal $V_{GATE}$ to decrease the average resistance of MOSFET Q1 over time.

The switching LED system 104 includes a chain of one or more, serially connected LEDs 108. When the MOSFET Q1 is "on", i.e. conductive, diode D1 is reversed bias and, current $i_{LED}$ flows through the LEDs and charges inductor $L_1$. When the MOSFET Q1 is "off", i.e. nonconductive, the voltage across inductor $L_1$ changes polarity, and diode $D_1$ creates a current path for the LED current $i_{LED}$. The inductor $L_1$ is chosen so as to store enough energy to maintain a constant current $i_{LED}$ when MOSFET Q1 is "off".

FIG. 2 depicts a power control system 200, which includes a switching power converter 202. The rectifier 103 rectifies the input mains voltage $V_{mains}$ and supplies a rectified, time-varying, primary supply voltage $V_x$ to the switching power converter. The switching power converter 202 provides a power factor corrected, approximately constant voltage power to load 222.

PFC and output voltage controller 214 controls PFC switch 208 so as to provide power factor correction and regulate the output voltage $V_c$ of switching power converter 202. The goal of power factor correction technology is to make the switching power converter 202 appear resistive to the voltage source 101. Thus, the PFC and output voltage controller 214 attempts to control the inductor current $i_L$ so that the average inductor current $i_L$ is linearly and directly related to the primary supply voltage $V_x$. The PFC and output voltage controller 214 supplies a pulse width modulated (PWM) control signal $CS_0$ to control the conductivity of switch 208. In at least one embodiment, switch 208 is a field effect transistor (FET), and control signal $CS_0$ is the gate voltage of switch 208. The values of the pulse width and duty cycle of control signal $CS_o$ depend on two feedback signals, namely, the primary supply voltage $V_x$ and the capacitor voltage/output voltage $V_c$. Output voltage $V_c$ is also commonly referred to as a "link voltage".

To convert the input voltage $V_x$ into a power factor corrected output voltage $V_c$, PFC and output voltage controller 214 modulates the conductivity of PFC switch 208. To regulate the amount of energy transferred and maintain a power factor close to one, PFC and output voltage controller 214 varies the period of control signal $CS_0$ so that the input current $i_L$ tracks the changes in input voltage $V_x$ and holds the output voltage $V_C$ constant. Thus, as the input voltage $V_x$ increases, PFC and output voltage controller 214 increases the period TT of control signal $CS_0$, and as the input voltage $V_x$ decreases, PFC and output voltage controller 214 decreases the period of control signal $CS_0$. At the same time, the pulse width (PW) of control signal $CS_0$ is adjusted to maintain a constant duty cycle of control signal $CS_0$, and, thus, hold the output voltage $V_C$ constant. The inductor current $i_L$ ramps 'up' when the switch 208 conducts, i.e. is "ON". The inductor current $i_L$ ramps down when switch 208 is nonconductive, i.e. is "OFF", and supplies inductor current $i_L$ to recharge capacitor 206. The time period during which inductor current $i_L$ ramps down is commonly referred to as the "inductor flyback time". Diode 211 prevents reverse current flow into inductor 210. Inductor current $i_L$ is proportionate to the 'on-time' of switch 208. In at least one embodiment, the switching power converter 202 operates in discontinuous current mode, i.e. the inductor current $i_L$ ramp up time plus the inductor flyback time is less than the period of the control signal $CS_0$, which controls the conductivity of switch 208. Prodić, *Compensator Design and Stability Assessment for Fast Voltage Loops of Power Factor Correction Rectifiers*, IEEE Transactions on Power Electronics, Vol. 22, No. 5, Sep. 2007, pp. 1719-1729 (referred to herein as "Prodić"), describes an example of PFC and output voltage controller 214.

In at least one embodiment, the PFC and output voltage controller 214 updates the control signal $CS_0$ at a frequency much greater than the frequency of input voltage $V_x$. The frequency of input voltage $V_x$ is generally 50-60 Hz. The frequency 1/TT of control signal $CS_0$ is, for example, between 20 kHz and 130 kHz. Frequencies at or above 20 kHz avoid audio frequencies and frequencies at or below 130 kHz avoids significant switching inefficiencies while still maintaining a good power factor of, for example between 0.9 and 1, and an approximately constant output voltage $V_C$.

Capacitor 206 supplies stored energy to load 212 when diode 211 is reverse biased. The capacitor 206 is sufficiently large so as to maintain a substantially constant output voltage $V_c$, as established by a PFC and output voltage controller 214 (as discussed in more detail below). The output voltage $V_c$ remains at a substantially constant target value during constant load conditions. However, as load conditions change, the output voltage $V_c$ changes. The PFC and output voltage controller 214 responds to the changes in voltage $V_c$ by adjusting the control signal $CS_0$ to return the output voltage $V_c$ to the target value. The PFC and output voltage controller 214 includes a small capacitor 215 to filter any high frequency signals from the primary supply voltage $V_x$.

PFC and output voltage controller 214 controls the process of switching power converter 202 so that a desired amount of energy is transferred to capacitor 206. The desired amount of energy depends upon the voltage and current requirements of load 212. To determine the amount of energy demand of load 212, the PFC and output voltage controller 214 includes a compensator 228. Compensator 228 determines a difference between a reference voltage $V_{REF}$, which indicates a target voltage for output voltage $V_c$, and the actual output voltage $V_c$ sensed from node 222 and received as feedback from voltage loop 218. The compensator 228 generally utilizes technology, such as proportional integral (PI) type control, to respond to differences in the output voltage $V_c$ relative to the reference voltage $V_{REF}$. The PI control processes the error so that the PFC and output voltage controller 214 smoothly adjusts the output voltage $V_c$ to avoid causing rapid fluctuations in the output voltage $V_c$ in response to small error signals. The compensator 228 provides an output signal to the pulse width modulator (PWM) 230 to cause the PWM 230 to generate a control signal $CS_0$ that drives switch 208.

An LED lighting system controller, such as controller 106, using a supply voltage that can vary from, for example, 8V to 450V generally requires a more expensive integrated circuit relative to an integrated circuit designed to operate at a fraction of the maximum supply voltage. Using a conventional PFC controller with feedback control, when the power demand of a load quickly decreases, the output voltage $V_C$ will momentarily increase while the PFC controller responds to output voltage feedback by lowering the output voltage. Conventional switching power converters using compensators generally respond relatively slowly to large changes in load power demand. Additionally, conventional PFC controllers often include large and relatively expensive electrolytic capacitors to accommodate voltage spikes.

SUMMARY OF THE INVENTION

In one embodiment of the present invention, a light emitting diode (LED) lighting system includes a power factor correction (PFC) and LED drive controller. The controller includes a digital signal processor, coupled to the LED feedback node and configured to: operate from a digital level supply voltage; generate a PFC control signal; and generate an LED current control signal. The controller further includes a first buffer, coupled to the processor, and configured to: operate from a medium level supply voltage. The medium level supply voltage is greater than the digital level supply voltage. The controller is further configured to receive the PFC control signal and convert the PFC control signal into a PFC switch control signal to control conductivity of a high voltage PFC switch. The controller further includes a second buffer, coupled to the processor, and configured to: operate from the medium level supply voltage; receive the LED current control signal; and convert the LED current control signal into an LED current control switch signal to control conductivity of a high voltage LED current control switch.

In another embodiment of the present invention, a method includes operating a digital signal processor of a power factor correction (PFC) and output voltage controller from a digital level supply voltage and generating a PFC control signal; and generating an LED current control signal. The method further includes operating a first buffer, coupled to the processor, from a medium level supply voltage. The medium level supply voltage is greater than the digital level supply voltage; receiving the PFC control signal. The method also includes converting the PFC control signal into a PFC switch control signal to control conductivity of a high voltage PFC switch and operating a second buffer, coupled to the processor, from the medium level supply voltage. The method further includes receiving the LED current control signal and converting the LED current control signal into an LED current control switch signal to control conductivity of a high voltage LED current control switch.

In a further embodiment of the present invention, a light emitting diode (LED) lighting system includes an LED lighting power system. During normal operation of the LED lighting system the LED lighting power system generates a first source voltage relative to a common voltage. The first source voltage is a link voltage. The LED lighting power system includes a switching power supply having a power factor correction (PFC) switch, wherein during normal operation of the LED lighting system, the PFC switch of the LED lighting power system operates at a current node voltage less than or equal to 0.1 times the first source voltage relative to the common voltage reference. The LED lighting power system also includes an LED current control switch, wherein during normal operation of the LED lighting system, the LED current control switch operates at a current node voltage less than or equal to 0.1 times the first source voltage relative to the common voltage reference. The LED lighting system further includes a PFC and output voltage controller coupled to conductivity control nodes of the first and LED drive current switches. During normal operation of the lighting control system, the controller operates from a second source voltage relative to the common voltage and controls conductivity of the PFC switch and the LED current control; and at least one LED coupled to the LED current control switch.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A light emitting diode (LED) lighting system includes a PFC and output voltage controller and a LED lighting power system. The LED lighting power system operates from a primary supply voltage derived from a primary power supply. The controller operates from an auxiliary power source supply, which provides an auxiliary voltage less than a link voltage generated by the LED lighting power system relative to a common reference voltage at a common reference node. By utilizing a lower voltage, in at least one embodiment, the controller can be manufactured at a lower cost than a comparable controller supplied by the primary power supply utilized by the LED lighting power system. Additionally, during normal operation of the LED lighting system, a power factor correction (PFC) switch and an LED drive current switch of the LED lighting system, that respectively control power factor correction and LED drive current, are coupled to the common reference node and have control node-to-common node, absolute voltage that allows the controller to control the conductivity of the switches. In at least one embodiment, the PFC switch and the LED drive current switch each have a control node-to-common node, absolute voltage within 15% of the link voltage relative to the common reference voltage. Having a current node voltage within 15% of the absolute value of the link voltage relative to the common reference voltage allows the controller to effectively control the switches.

Figure 3:
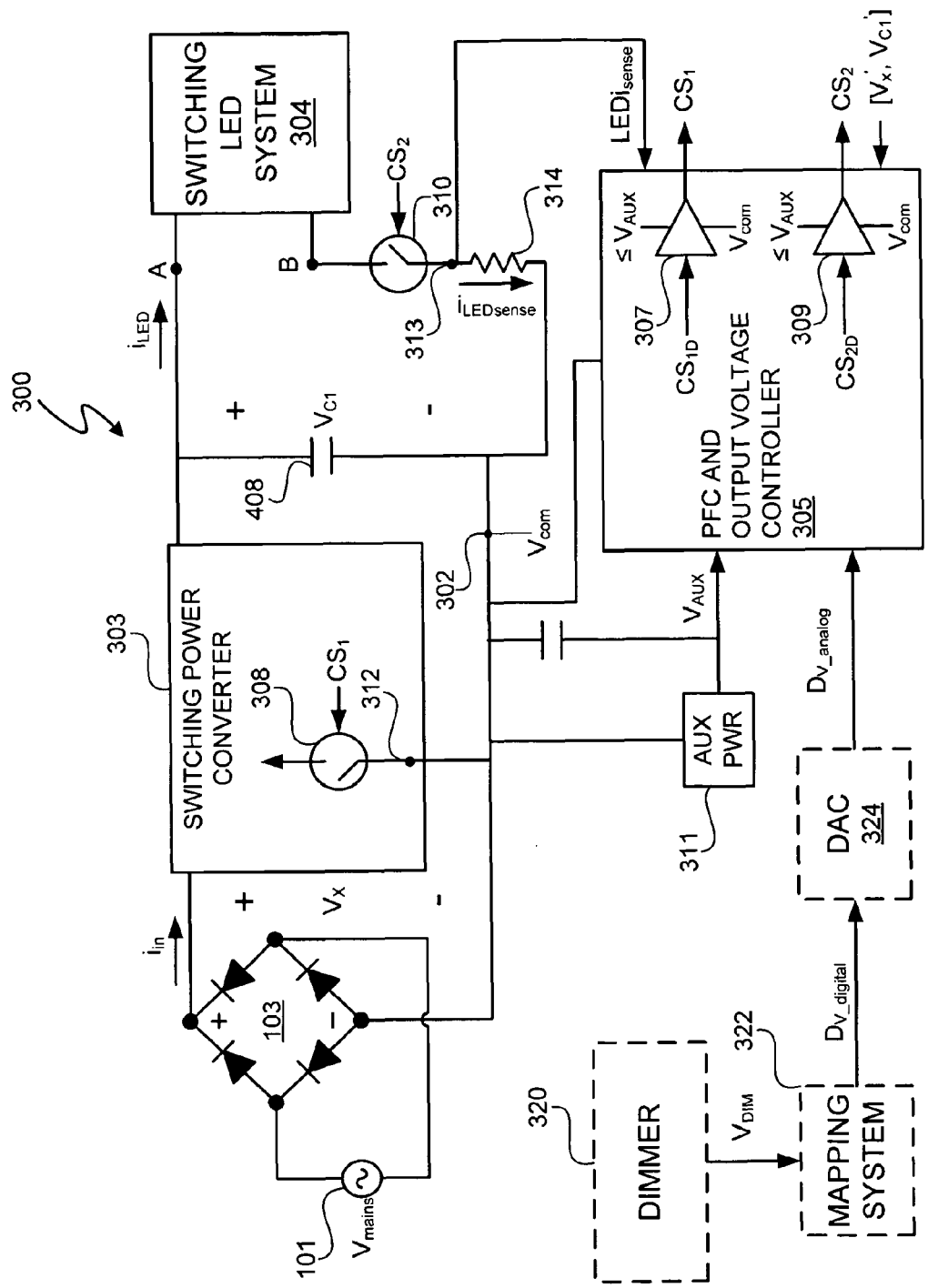
FIG. 3 depicts a LED lighting system that includes a common reference node at a common reference voltage.
Figure 4:
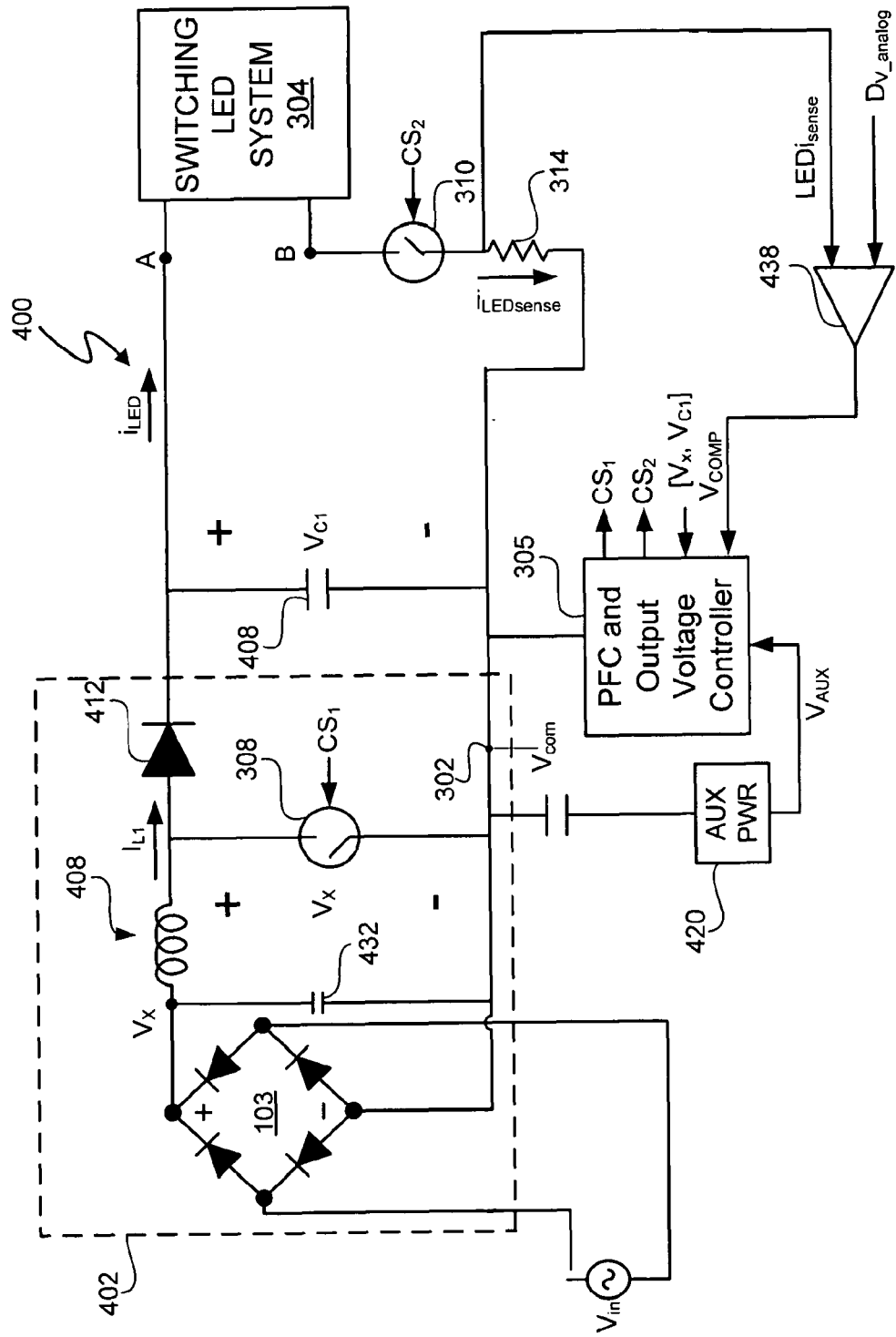
FIG. 4 depicts a LED lighting system.

In at least one embodiment, the controller 305 is manufactured in a 12-20 Volt ("V") complimentary metal oxide semiconductor (CMOS) integrated circuit process ("IC Process"), coupled to 200V-500V rated field effect transistors (FETs) external to the integrated circuit (IC) controller. This embodiment is a particularly cost-effective combination of technologies. In a further refinement of the preferred embodiment, the IC Process also includes 5V or lower transistors in the IC controller in addition to the 12V-20V transistors, allowing for dense digital designs. A digital controller, in 0.35 micron or finer process technology allows for a very small, cost effective, digital controller. A 12V-20V process allows for the appropriate driving of the gates of external high-voltage FETs. In at least one embodiment, the IC controller is controller 305 (FIGS. 3 and 4). The foregoing voltage limits typically indicate that the high voltage devices (which have approximately 12V of gate-source voltage to be fully turned on, and less than 1V to be fully turned off) have sources at nearly the same voltage potential, in order that the same controller can drive both.

An LED lighting system that includes dimming capability can be subject to rapid changes in power demand by a switching LED system load. The switching LED system includes one or more light emitting diodes (LED(s)). For example, if the LED(s) are operating at full intensity and a dimming level of 15% of full intensity is requested, the power demand of the switching LED system is quickly and significantly reduced. In at least one embodiment, the LED lighting system utilizes feedforward control to allow the controller to concurrently modify power demand by the LED lighting power system and power demand of one or more switching LED systems. Thus, in at least one embodiment, the LED lighting system can quickly respond to the lower power demand by reducing power received from a power source, such as a mains source, and use a compensator, such as a proportional integral (PI) type control, to make relatively small corrections to maintain a desired LED lighting system output voltage.

Additionally, in at least one embodiment, the LED lighting system includes multiple switching LED systems, and each switching LED system includes at least one LED. In at least one embodiment, the LED lighting system utilizes a common current sense device to provide a common feedback signal to the controller representing current in at least two of the switching LED systems. In at least one embodiment, utilizing a common current sense device reduces a number of pins of the controller used for feedback and reduces a number of current sense devices.

FIG. 3 depicts a LED lighting system 300 that includes a common reference node 302 at a common reference voltage $V_{com}$, such as a ground reference during normal operation. The LED lighting system 300 operates from two supply voltages, $V_x$ and $V_{AUX}$, which are both referenced to the common reference voltage. A third voltage, $V_D$ (shown in FIG. 15), can be generated internal to the controller 305 and is preferably in the range of 1.5V-5.0V, depending on the chosen CMOS technology. "Normal operation" refers to the operation of LED lighting system 300 after power has been supplied to the LED lighting system 300 and any initial voltage or current transients have subsided. The LED lighting system 300 generates a link voltage $V_{C1}$. The PFC switch 308 and LED drive current control switch 310 have absolute, control node-to-common node voltages within 15% of the difference between the absolute link voltage $V_{C1}$ minus the common reference voltage $V_{com}$, ie. $V_{C1} - V_{com}$. PFC and output voltage controller 305 (referred to as "controller 305") operates from an auxiliary supply voltage $V_{AUX}$. The absolute value of auxiliary supply voltage $V_{AUX}$ is less than the absolute value of the link voltage $V_{C1}$.

Figure 5B:
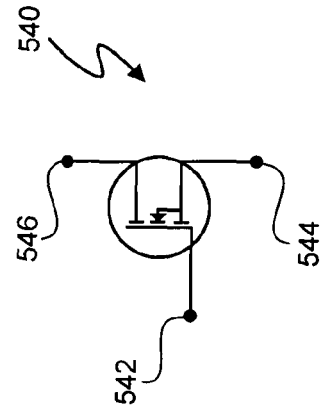
FIGS. 5A, 5B, 5C, and 5D depict various switches.
Figure 5E:
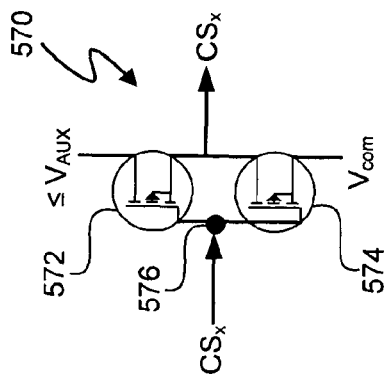
FIG. 5E depicts a driver circuit.
Figure 5D:
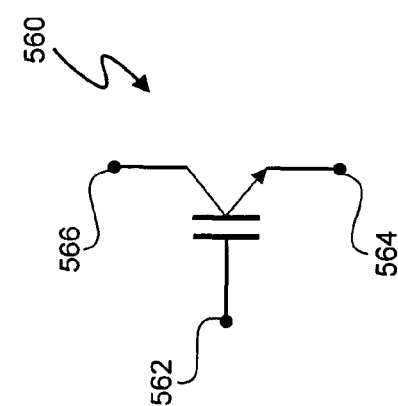
Figure 5A:
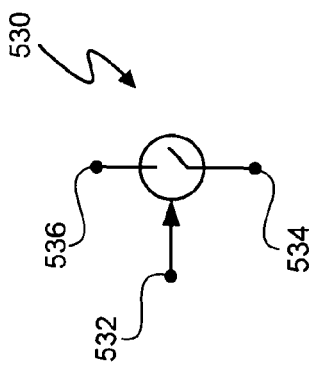
Figure 5C:
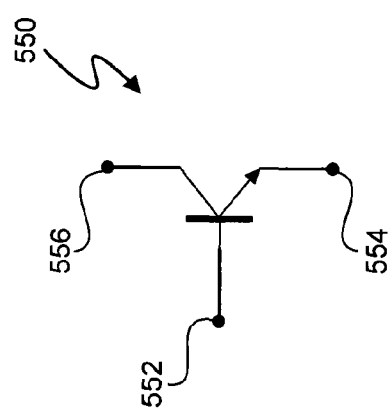

FIGS. 5A, 5B, 5C, and 5D depict exemplary embodiments of switch 530, which represents one embodiment of switches 308 and 310. Referring to FIG. 5A, the nodes of 532, 534, and 536 of generic switch 530 represent respective control, common, and switching nodes. FIGS. 5B, 5C, and 5D represent embodiments of switch 530. Referring to FIG. 5B, switch 540 is an n-channel MOSFET, and gate node 542, source node 544, and drain node 546 respectively represent a control node, a common node, and a switching node. Referring to FIG. 5C, switch 550 is a bipolar junction transistor (BJT), and base node 552, emitter node 554, and collector 556 respectively represent a control node, a common node, and a switching node. Referring to FIG. 5D, switch 560 is an insulated gate bipolar transistor (IGBT), and gate node 562, emitter node 564, and collector 566 respectively represent a control node, a common node, and a switching node.

FIG. 5E depicts an exemplary driver circuit 570, which represents one embodiment of drivers 307 and 309. The source of p-channel FET 572 and the drain of n-channel FET 574 are connected together and provide the output signal $CS_x$ where $CS_x$ represents control signals $CS_1$ and $CS_2$. The drain of p-channel FET 572 is connected to the high side supply rail voltage, which is less than or equal to auxiliary voltage $V_{AUX}$. The source of n-channel FET 574 is connected to the low side supply rail voltage $V_{com}$. FETs 572 and 574 share a gate node 576 to receive the control signal $CS_x$.

Figure 1:
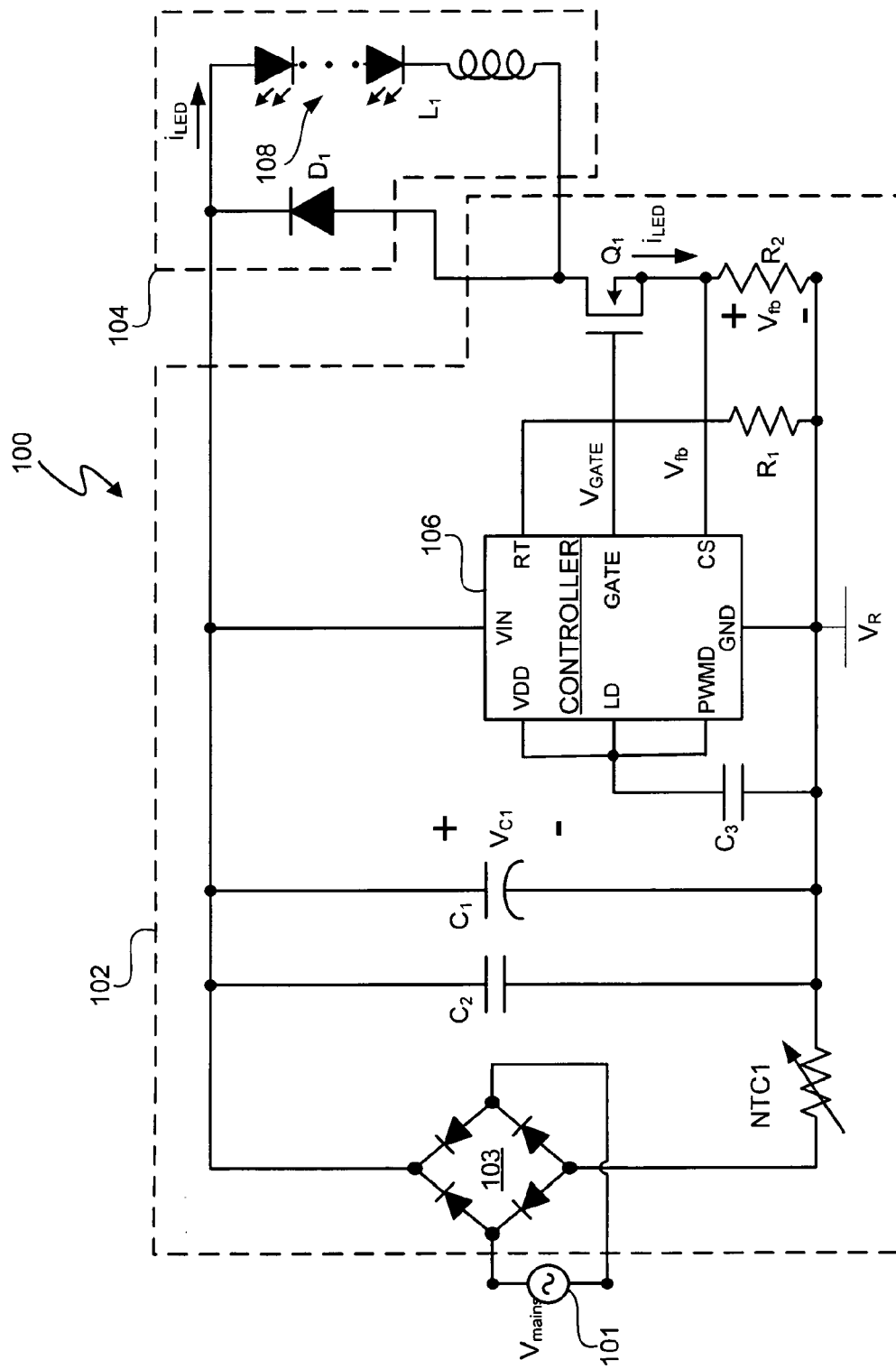
FIG. 1 (labeled prior art) depicts a switching light emitting diode (LED) driver system FIG. 2 (labeled prior art) depicts a power control system, which includes a switching power converter.
Figure 2:
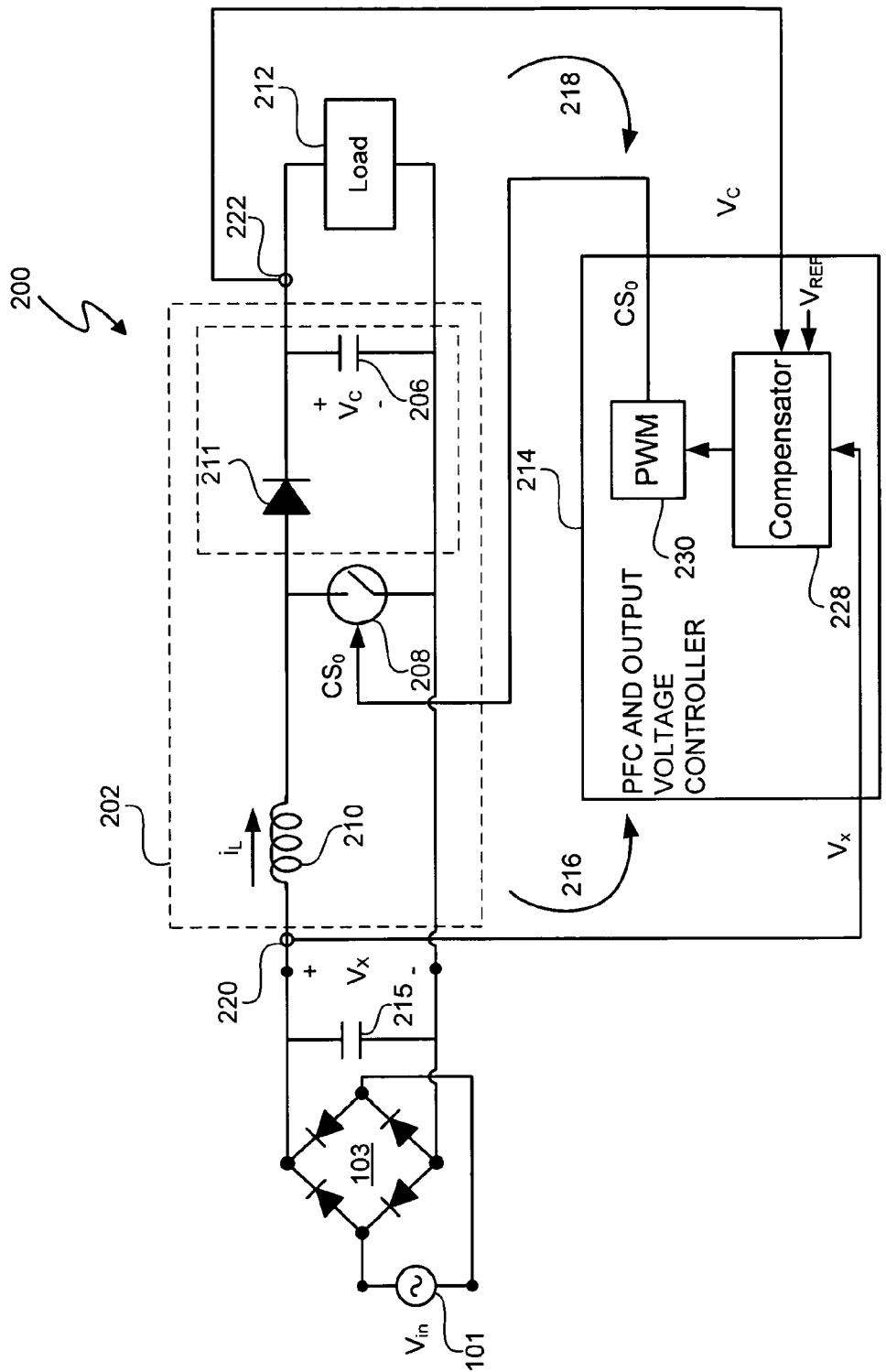

Referring to FIG. 3, diode rectifier 103 rectifies the input mains voltage $V_{mains}$ and supplies a rectified, time-varying, primary supply voltage $V_x$ to a switching power converter 303. In at least one embodiment, mains voltage $V_{mains}$ is a mains voltage such as the mains voltage $V_{mains}$ in FIGS. 1 and 2. Referring to FIG. 3, the auxiliary power supply 311 provides low voltage power to the controller 305. Providing low voltage power to the controller 305 allows controller 305 to be manufactured at a lower cost than higher voltage controllers. Additionally, during normal operation of the LED lighting system, a power factor correction (PFC) switch and an LED drive current switch of the LED lighting system, that respectively control power factor correction and LED drive current, are coupled to the common reference node and have control node-to-common node, absolute voltage that allows the controller to control the conductivity of the switches. During normal operation, the switching power converter 303 converts the primary supply voltage $V_x$ into an output, link voltage $V_{C1}$. In at least one embodiment, by referencing controller 305 to the common reference node and establishing the control node-to-common node voltages of switches 308 and 310 within 15% of the voltage difference $V_{C1} - V_{com}$, controller 305 is able to control the conductivity of the switches 308 and 310 while operating from the auxiliary voltage $V_{AUX}$ of auxiliary power supply 311. In at least one embodiment, the voltages at current nodes 312 and 313 are within +1V of the common reference voltage $V_{com}$. A current sense resistor may or may not be required in the PFC switch 308, depending on the control mode chosen for the controller 305. In the preferred embodiment, controller 305 is a discontinuous current mode controller and does not use a current sense for controlling power factor correction.

The auxiliary power supply 311 supplies power to controller 305. The auxiliary power supply 311 provides a supply voltage $V_{AUX}$ less than, such as approximately from 1% to 15%, the absolute value of the link voltage $V_{C1}$. For example, in at least one embodiment, the nominal RMS primary supply voltage $V_x$ is 110V, and the supply voltage $V_{AUX}$ is any value within the range of +1V to +15V, such as +1V, +3V, +5V, +12V, or +15V. Because controller 305 is powered by a relatively small supply voltage, controller 305 can be manufactured less expensively than a controller manufactured for higher supply voltages. The voltage $V_{AUX}$ is chosen commensurate with the required drive voltage of the external switch. For an FET, this voltage is typically around 12V. For a bipolar transistor, current drive would often be used, and the voltage would be 1V-2V.

During normal operation, the switching power converter 303 converts the primary supply voltage $V_x$ into an output, link voltage $V_{C1}$. In at least one embodiment, switching power converter 303 is a boost converter, i.e. link voltage $V_{C1} > V_x$. For a particular dimming level, the switching power converter 303 provides an approximately constant current $i_{LED}$ to LED light source 308. The current $i_{LED}$ varies with dimming levels but, in at least one embodiment, is approximately constant for a particular dimming level. The switching power converter 303 includes switch 308 to control the input current $i_{in}$ so that the average input current $i_{in}$ is linearly and directly related to the primary supply voltage $V_x$, thereby making the switching power converter 303 appear resistive to voltage source 301. By controlling the input current $i_{in}$, switch 308 also controls the value of link voltage $V_{C1}$. During normal operation of the LED lighting system 300, the link voltage $V_{C1}$ has an approximately constant value over time and, thus, approximates a DC voltage. In at least one embodiment, the switching LED system 304 includes one or more individual LEDs or one or more parallel coupled strings of LED(s) as, for example, described in more detail with reference to FIGS. 5A and 5B. The link voltage $V_{C1}$ is typically in the range of 200V-500V, depending on the AC mains voltage $V_{mains}$.

Controller 305 generates PFC control signal $CS_1$ to control the conductivity of switch 308. Controller 305 includes a buffer 307 to provide the drive current for PFC control signal $CS_1$. Controller 305 generates a digital PFC control signal $CS_{1D}$ that is amplified by buffer 307 to generate PFC switch control signal $CS_1$. Buffer 307 operates from a high side voltage supply rail of less than or equal to auxiliary voltage $V_{AUX}$ and from a low side voltage supply rail of common voltage $V_{com}$. Controller 305 adjusts the pulse width of PFC control signal $CS_1$ to increase as the primary supply voltage $V_x$ increases and to decrease as primary supply voltage $V_x$ decreases to provide power factor correction. Controller 305 maintains a duty cycle of PFC control signal $CS_1$ while adjusting the pulse width of PFC control signal $CS_1$ to maintain an approximately constant link voltage $V_{C1}$. Controller 305 receives feedback signal $V_x'$ to detect the value of voltage $V_x$. Controller 305 also receives feedback signal $V_{C1}'$ to detect the value of voltage $V_{C1}$. Controller 305 uses the value of detected feedback signals $V_x'$ and $V_{C1}'$ to adjust PFC control signal $CS_1$ so that switching power converter 303 provides power factor correction and maintains an approximately constant link voltage $V_{C1}$.

The controller 305 can be implemented to generate the PFC control signal $CS_1$ in any of a variety of ways, such as the exemplary ways described in Melanson IV, Melanson V, and Melanson VII. The feedback signals $V_x'$ and $V_{C1}'$ can be generated in any of a variety of ways, such as the exemplary ways described in Melanson V, Melanson VI, and Melanson VIII.

Controller 305 generates an LED current control switch signal $CS_2$ to modulate the conductivity of LED drive current control switch 310. Controller 305 generates a digital LED current control signal $CS_{2D}$ that is amplified by buffer 309 to generate LED current control switch control signal $CS_2$. Controller 305 includes a buffer 309 to provide the drive current for LED current control switch signal $CS_2$. Buffer 309 operates from a high side voltage supply rail of less than or equal to auxiliary voltage $V_{AUX}$ and from a low side voltage supply rail of common voltage $V_{com}$. In at least one embodiment, LED current control switch signal $CS_2$ is a duty cycle modulated gate drive signal. The duty cycle modulated gate drive signal modulating the conductivity of switch 310 controls the LED current $i_{LED}$ supplied by switching power converter 303. The current $i_{LED}$ serves as the drive current for switching LED system 304. Adjusting the current $i_{LED}$ modifies the intensity of switching LED light system 304. The controller 305 modulates the conductivity of switch 310 so that an average LED current $i_{LED}$ causes each LED in the switching LED system 304 to illuminate at a desired intensity level. In a non-dimmed configuration of LED lighting system 300, the desired intensity level is, for example, the full (100%) rated intensity of the LED(s) of the switching LED system 304 or zero (0) intensity (off).

As subsequently described in more detail, to regulate the LED drive current $i_{LED}$, the controller 305 receives a LED feedback signal $LEDi_{sense}$ from a current sense device 314. In at least one embodiment, the feedback signal $LEDi_{sense}$ is the current $i_{LED}$ or a scaled version of the current $i_{LED}$. In another embodiment, the feedback signal $LEDi_{sense}$ is a voltage that is directly proportional to the current $i_{LED}$. The controller 305 responds to the feedback signal $LEDi_{sense}$ by modifying the current delivered to the switching LED system 304 to maintain a desired LED current $i_{LED}$ and desired link voltage $V_{C1}$. The current sense device 314 can be any device capable of sensing the LED current $i_{LED}$. In at least one embodiment, current sense device 314 is a resistor, and the feedback signal $LEDi_{sense}$ is a voltage sensed across the resistor. In at least one embodiment, the feedback signal $LEDi_{sense}$ is sensed by a magnetic current sensor in the proximity of current flowing through an inductor (such as inductor 606 of FIG. 6A or inductor 612 of FIG. 6B) in switching LED system 304. In at least one embodiment, current sense device 314 is a current mirror circuit. Current mirrors are generally not used in high voltage applications. Controller 305 can generate LED current control switch signal $CS_2$ in any of a variety of ways. Melanson III describes an exemplary system and method for generating LED current control switch signal $CS_2$.

In at least one embodiment, LED lighting system 300 can dim the LED(s) of switching LED system 304, i.e. adjust the intensity of the LED(s) of switching LED system 304, in response to a dimmer signal $D_V$. The dimmer signal $D_V$ can be a digital dimming signal $D_{V\_digital}$ or an analog dimming signal $D_{V\_analog}$ indicating a dimming level for switching LED system 304. Values of dimmer signal $D_V$ function as a target reference and are compared with $LEDi_{sense}$ external to controller 305 or an integral part of an integrated circuit version of controller 305. In at least one embodiment, the controller 305 adjusts LED current control switch signal $CS_2$ to minimize a difference between the comparison between the dimmer signal $D_V$ and the feedback signal $LEDi_{sense}$. In at least one embodiment, the dimmer signal $D_V$ is generated and detected as described in Melanson I and Melanson II.

In at least one embodiment, the dimmer signal $D_V$ represents a mapping of a conventional, duty cycle modified dimmer signal to predetermined values different than the dimming level represented by the dimmer output signal value. In at least one embodiment, a conventional dimmer 320 generates a dimming signal $V_{DIM}$. The dimming signal $V_{DIM}$ is, for example, a duty cycle modified (i.e. phase-cut) analog signal whose duty cycle or phase angle represents a dimming level.

Mapping system 322 includes a lighting output function that converts the dimmer levels indicated by dimming signal $V_{DIM}$ to a digital dimming signal $D_{V\_digital}$ having values that map measured light levels to perception based light levels as described in conjunction with the exemplary systems and methods of Melanson I and Melanson II. In at least one embodiment, controller 305 uses the digital dimming signal $D_{V\_digital}$ directly to generate LED current control switch signal $CS_2$. In at least one embodiment, digital-to-analog converter (DAC) 324 converts the digital dimming signal $D_{V\_digital}$ into a corresponding analog dimming signal $D_{V\_analog}$. The digital and analog versions of dimming signal $D_V$ are generically referred to here as dimming signal $D_V$. Dimmer 320, mapping system 322, and DAC 324 are shown in "dashed lines" because dimming is optional for LED lighting system 300.

FIG. 4 depicts a LED lighting system 400, which represents one embodiment of LED lighting system 300. LED lighting system 400 includes switching power converter 402 to convert the rectified input voltage $V_x$ into an approximately DC link voltage $V_{C1}$. Switching power converter 402 and controller 305 also provide power factor correction. The switching power converter 402 includes a switch 308 that turns 'on' (conducts) and turns 'off' (nonconductive) in response to a PFC control signal $CS_1$ generated by PFC and output voltage controller 305. When switch 308 is 'on', inductor 408 energizes with the current $I_{L1}$ from the full-bridge diode rectifier 103. When switch 308 is 'off', the inductor 408 drives current $I_{L1}$ through diode 412 to charge capacitor 408. The PFC control signal $CS_1$ varies the duty cycle of switch 308 so that the DC voltage link voltage $V_{C1}$ on storage capacitor 408 averages to a desired value of DC voltage $V_{C1}$. In at least one embodiment, steady state voltage $V_{C1}$ has an average value in the range of 200 V to 400 V. In at least one embodiment, current $I_{L1}$ represents current $i_{in}$ of FIG. 3. PFC and output voltage controller 305 operates as previously described to control the duty cycle of switch 308 such that current $L_i$ is linearly proportional to the input voltage $V_x$. Capacitor 432 provides filtering to smooth inductor current $I_{L1}$ so that the average inductor current $I_{L1}$ is sinusoid in phase with input signal $V_x$.

Controller 305 generates LED current control switch signal $CS_2$ based on the value of the comparator 438 output signal $V_{comp}$. In at least one embodiment, comparator output signal $V_{comp}$ is a voltage representing a logical "1" if the value of feedback signal $LEDi_{sense}$ is greater than an analog value of dimmer signal $D_{V\_analog}$. Otherwise, the value of comparator output signal $V_{comp}$ is a logical "0". The dimmer signal $D_V$ is a target reference value, and controller 305 generates controls signal $CS_2$ to modify the current $i_{LED}$ to minimize differences between feedback signal $LEDi_{sense}$ and dimmer signal $D_{V\_analog}$. The dimmer signal $D_{V\_analog}$ is scaled so that when the difference between feedback signal $LEDi_{sense}$ and dimmer signal $D_{V\_analog}$ is minimized, the intensity of the LED(s) of switching LED system 304 matches the dimming level indicated by dimmer signal $D_{V\_analog}$. As the dimming level indicated by dimmer signal $D_{V\_analog}$ changes, the value of comparator output signal $V_{comp}$ also changes so that controller 305 causes LED current control switch signal $CS_2$ to track the changes in dimming level indicated by dimmer signal $D_{V\_analog}$. As previously described, in at least one embodiment, controller 305 uses the comparator output signal $V_{comp}$ to generate LED current control switch signal $CS_2$ as described in Melanson III.

Figure 6B:
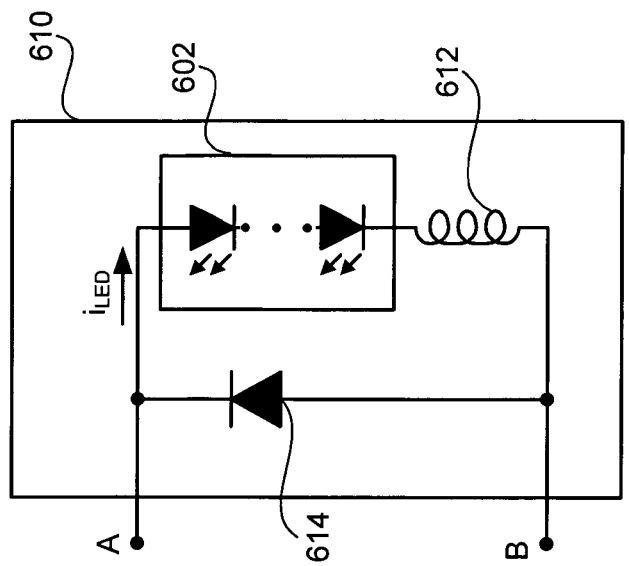
FIGS. 6A and 6B depict switching LED systems.
Figure 6A:
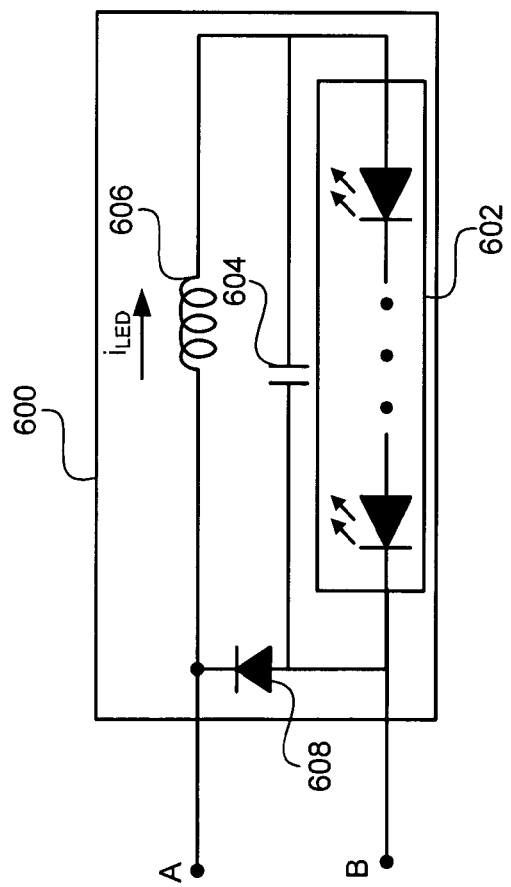

FIGS. 6A and 6B depict exemplary embodiments of switching LED system 304. Switching LED system 600 includes one or more LED(s) 602. The LED(s) 602 can be any type of LED including white, amber, other colors, or any combination of LED colors. Additionally, the LED(s) 602 can be configured into any type of physical arrangement, such as linearly, circular, spiral, or any other physical arrangement. In at least one embodiment, each of LED(s) 602 is serially connected. Capacitor 604 is connected in parallel with LED(s) 602 and provides filtering to protect the LED(s) 602 from AC signals. Inductor 606 smooths energy from LED current $i_{LED}$ to maintain an approximately constant current $i_{LED}$ when switch 310 conducts. Diode 608 allows continuing current flow when switch 310 opens.

In switching LED system 610, inductor 612 is connected in series with LED(s) 602 to provide energy storage and filtering. Inductor 612 smoothes energy from LED current $i_{LED}$ to maintain an approximately constant current $i_{LED}$ when switch 310 conducts. Diode 614 allows continuing current flow when switch 310 opens. Although two specific embodiments of switching LED system 304 have been described, switching LED system 304 can be any switching LED system.

Figure 7:
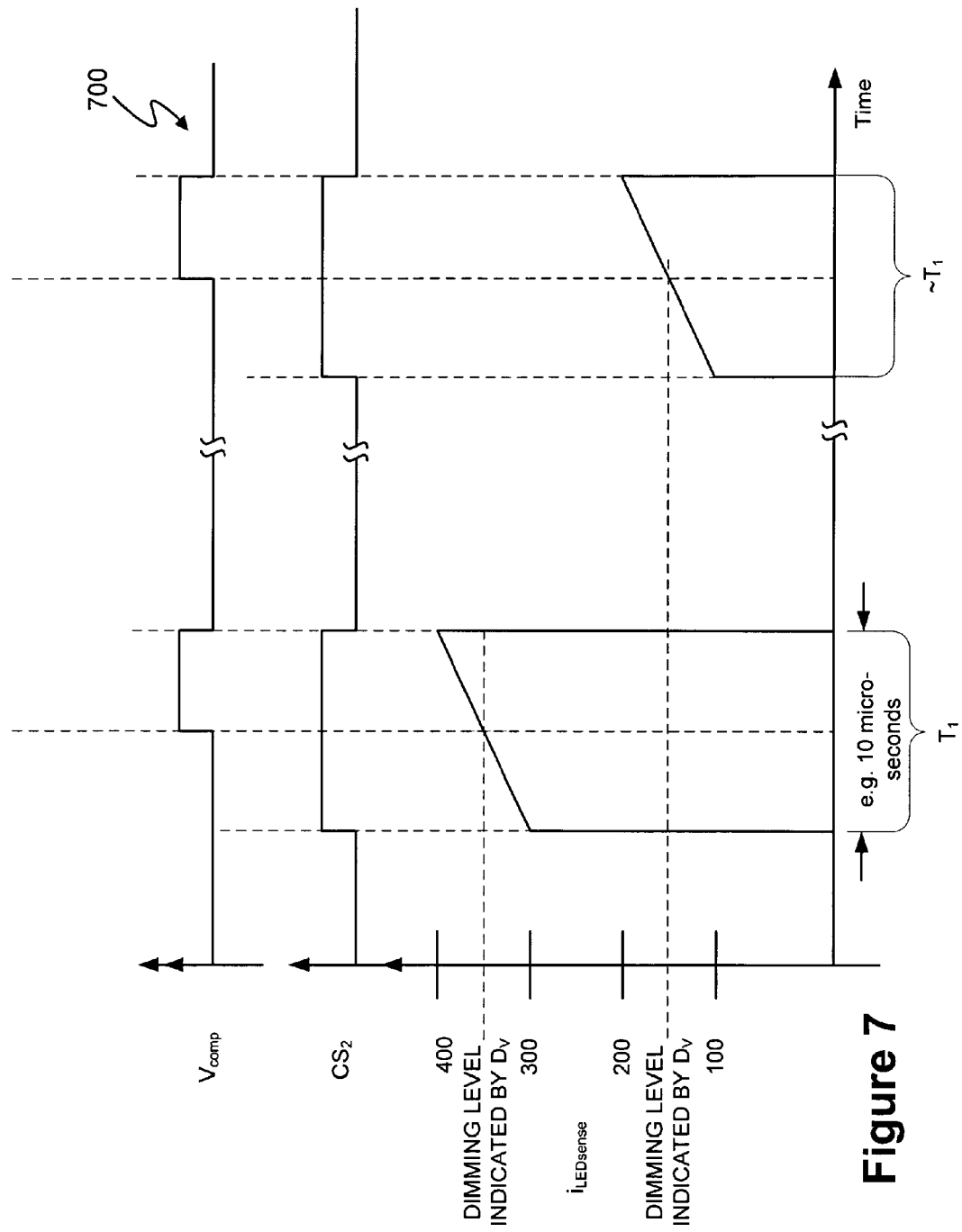
FIGS. 7-8 depict graphical relationships between various control signals, sense signals, and currents of the LED lighting system of FIG. 4.

FIG. 7 depicts a graphical relationship 700 between the comparator voltage $V_{COMP}$, LED current control switch signal $CS_2$, and current $i_{LEDsense}$ (FIG. 4). When LED current control switch signal $CS_2$ is high, switch 310 conducts, and LED current $i_{LED}$ increases. When the comparator voltage $V_{COMP}$ goes high, PFC and output voltage controller 305 keeps LED current control switch signal $CS_2$ high until the comparator voltage $V_{COMP}$ goes low again. In this manner, the average current $i_{LEDsense}$, and, thus, the average LED current $i_{LED}$, is responsive to the dimmer signal Dv, and, thus, the intensity of the LED(s) in switching LED system are also responsive to dimmer signal Dv.

Figure 8:
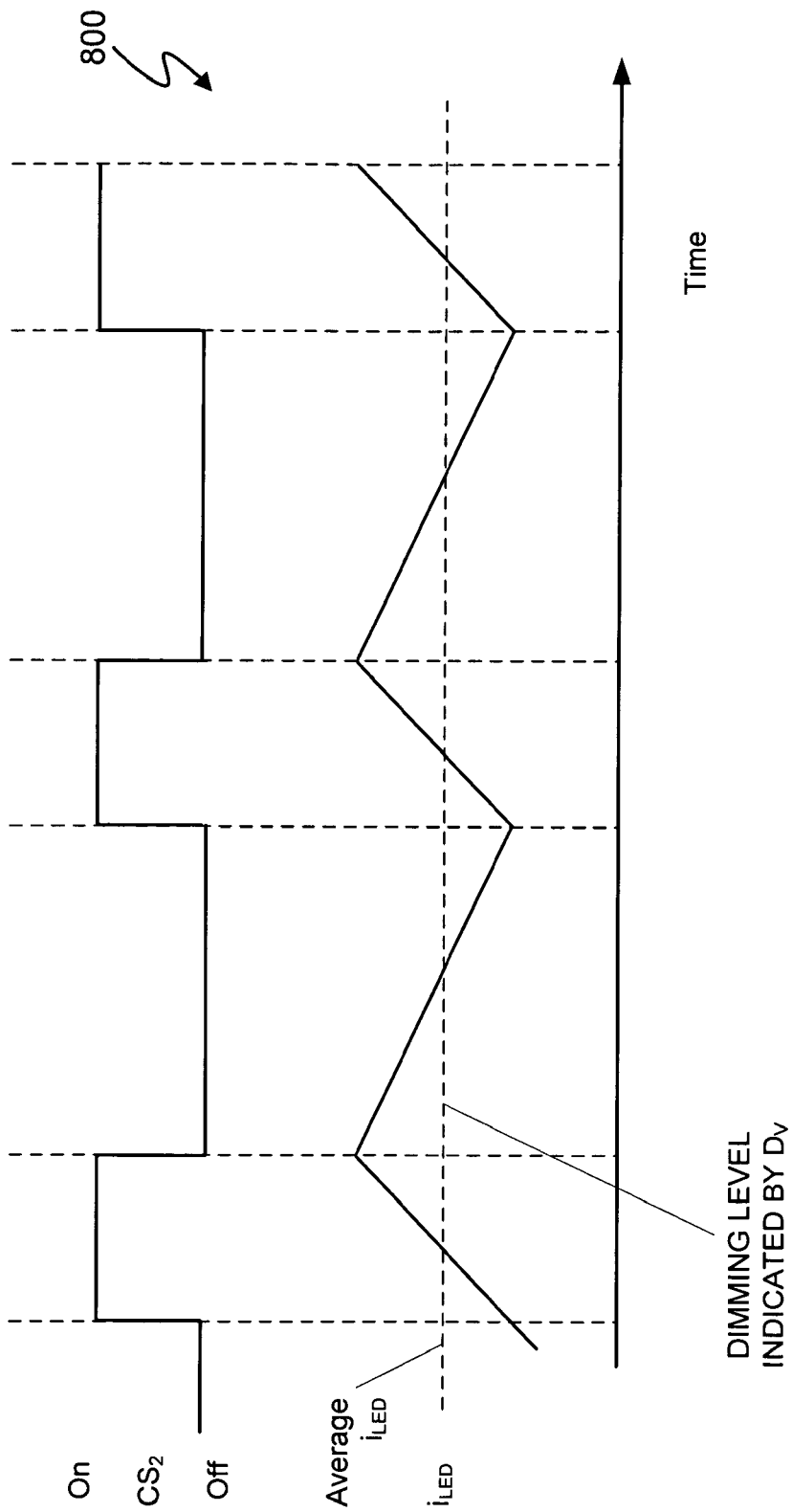

FIG. 8 depicts a graphical relationship 800 between LED current control switch signal $CS_2$ and current $i_{LED}$. The LED current $i_{LED}$ ramps up when LED current control switch signal $CS_2$ is high (i.e. causes switch 310 to conduct) and ramps down when LED current control switch signal $CS_2$ is low (i.e. causes switch 310 to turn 'off'). The average current $i_{LED}$ tracks the dimmer signal Dv. The intensity of switching LED system 304 is approximately directly proportional to the driving LED current $i_{LED}$.

Figure 9:
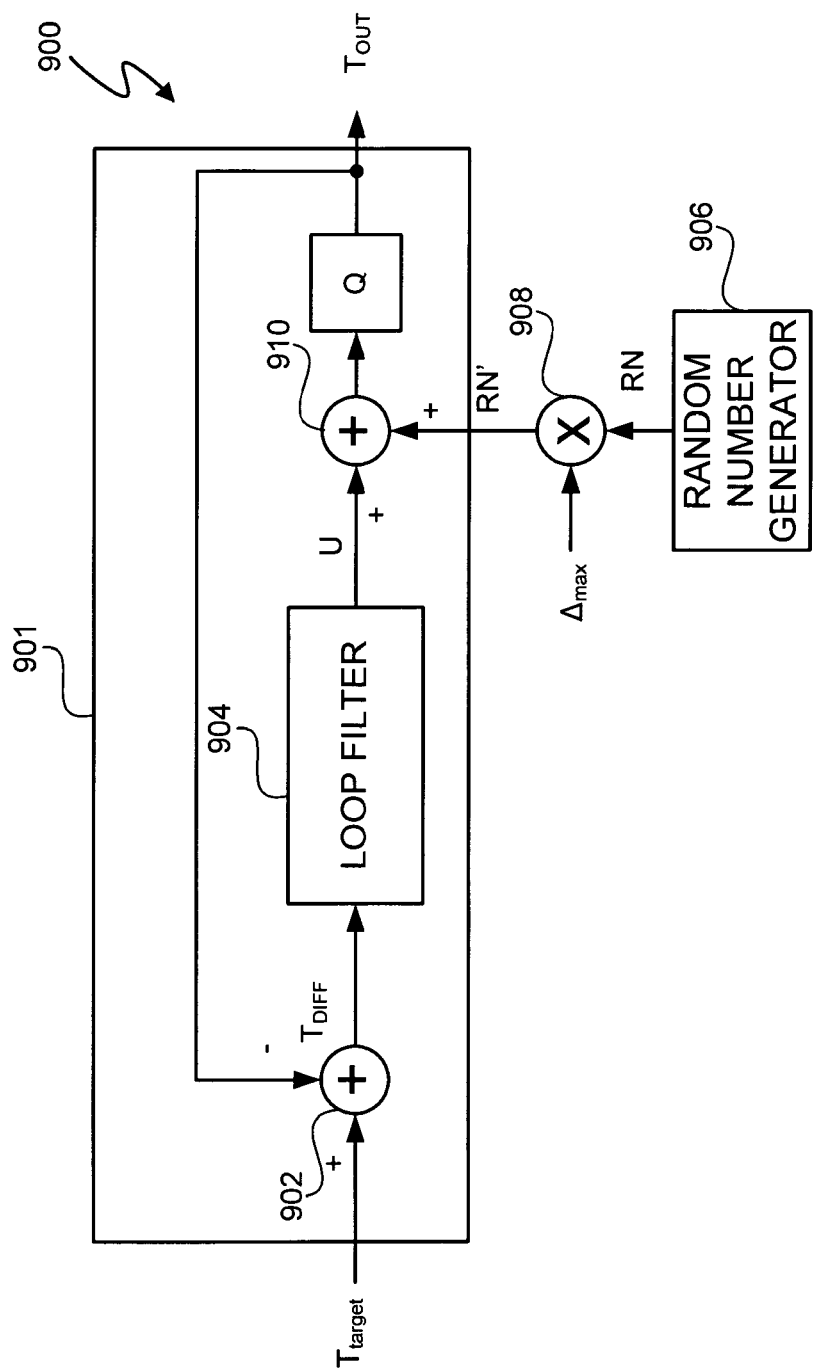
FIG. 9 depicts a spread spectrum system.

FIG. 9 depicts one embodiment of a spread spectrum system 900. The spread spectrum system can be included as part of controller 305 or can be constructed using separate discrete components as a separate IC. Spread spectrum system 900 can also be implemented as code stored in a computer readable medium and executable by controller 405. In general, spread spectrum system 900 receives an input signal $T_{Target}$ and generates an output signal $T_{OUT}$. Output signal $T_{OUT}$ randomly varies from input signal $T_{Target}$ within a predetermined range set by $\Delta_{max}$, and an average value of output signal $T_{OUT}$ equals input signal $T_{Target}$. Input signal $T_{Target}$ is, for example, a pulse width of control signals $CS_1$ and/or $CS_2$. The value of $\Delta_{max}$ is, for example, +/−10% of a nominal value of PFC control signal $CS_1$. Multiple spread spectrum system 900 can be used by controller 305 to spread the spectrum of multiple input signals such as the pulse widths of control signals $CS_1$ and $CS_2$.

Spread spectrum system 900 includes a delta-sigma modulator 901. Delta-sigma modulator 901 includes an adder 902 that adds the current value of input signal $T_{Target}$ to a negative value of the previous value of output signal $T_{OUT}$ to generate a difference signal $T_{Diff}$. In at least one embodiment, spread spectrum system 900 is initialized as startup with output signal $T_{OUT}$=0. The difference signal $T_{Diff}$ is processed by loop filter 904 to generate a loop filter output signal U.

The values of delta-sigma modulator output signal $T_{OUT}$ are randomized around the values of input signal $T_{Target}$. A random number generator 906 generates random output values of random signal RN that are multipled by $\Delta_{max}$ to generate random signal RN'. During each cycle of spread spectrum system 900, adder 910 adds the random signal RN' to the loop filter output signal U, and quantizer 912 quantizes the sum of RN' and U to generate the quantization output signal $T_{OUT}$. Random Number Generator 906 has predetermined value ranges set by a range limiting value $\Delta_{max}$. In at least one embodiment, RN' varies approximately 10%.

Delta-sigma modulator 901 can be any delta-sigma modulator such as any first order or multi-order delta-sigma modulator described in, for example, *Understanding Delta-Sigma Data Converters* by Schreier and Temes, IEEE Press, 2005, ISBN 0-471-46585-2 or as available from Cirrus Logic Inc. of Austin, Tex., U.S.A. The delta-sigma modulator 901 provides noise-shaping and seeks to consistently generate values of delta-sigma output signal $T_{OUT}$ that minimize the difference between output signal $T_{OUT}$ and difference signal $T_{Diff}$. Thus, delta-sigma modulator 901 helps ensure that the average output signal $T_{OUT}$ equals the average input signal $T_{Target}$.

Figure 10:
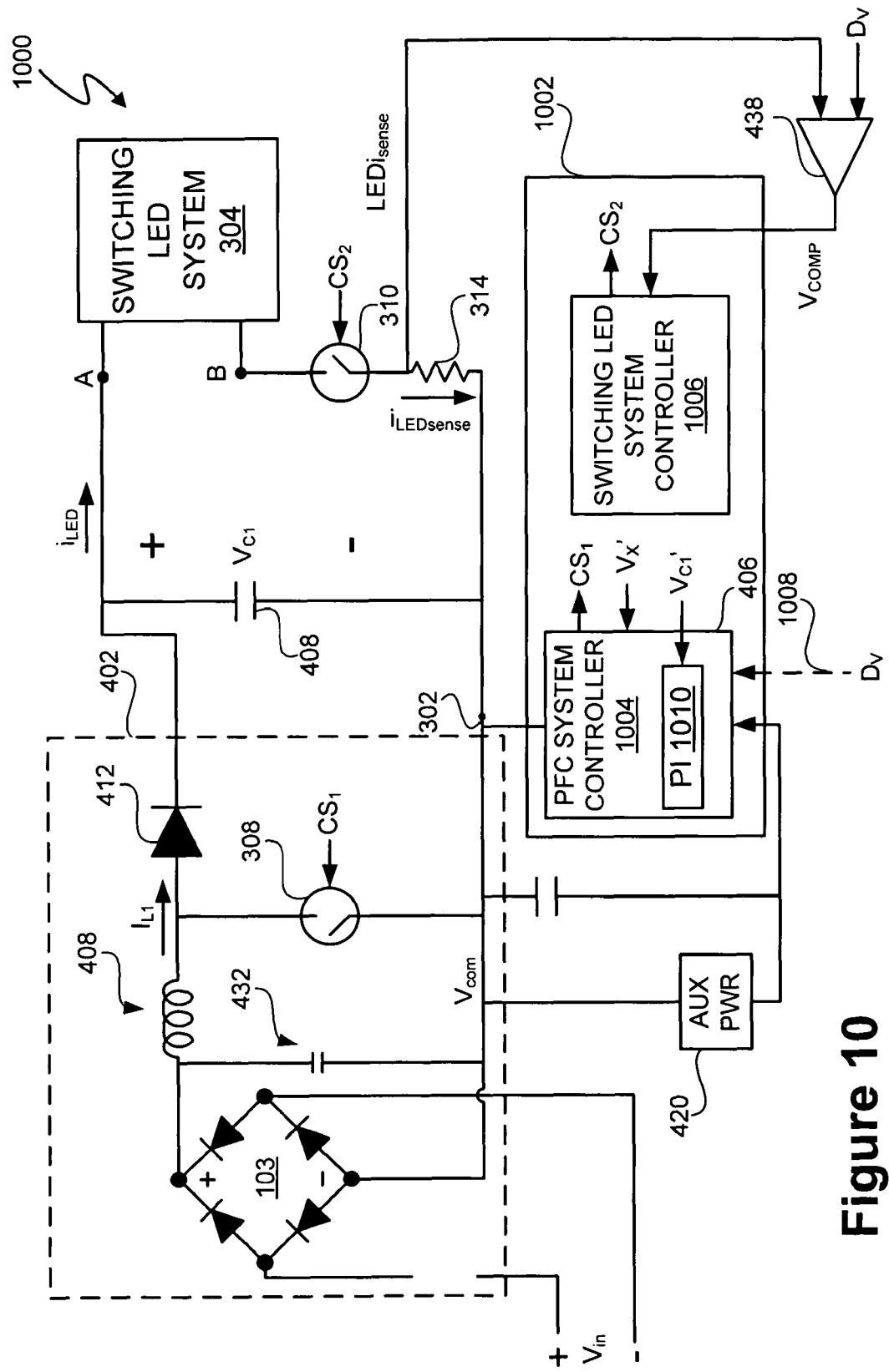
FIG. 10 depicts one embodiment of a feed forward lighting power and control system.

FIG. 10 depicts one embodiment of a feed forward lighting power and control system 1000. Power and control system 1000 preferably also includes a common reference node for switches 308 and 310 (through current sense device 314) and controller 1002. Controller 1002 represents one embodiment of controller 305. Controller 1002 is logically divided into two separate control systems, PFC control system 1004 to control power factor correction and regulate the link voltage $V_{C1}$ of switching power converter 402, and switching LED system controller 1006 to control the LED current $i_{LED}$ and, thus, control the intensity (i.e. brightness) of switching LED system 304.

The power and control system 1000 utilizes feed forward control so that PFC controller 1004 can more rapidly respond to changing power demands of Switching LED system light source 304 due to dimming When dimmer signal Dv indicates a change in the dimming level of light source 304, switching LED system controller 1006 responds to dimming signal Dv by decreasing the pulse width of duty cycle modulated LED current control switch signal $CS_2$ to reduce the average values of current $i_{LED}$. Decreasing current $i_{LED}$ reduces the power demand of light source 304.

Feed forward control allows PFC system controller 1004 to anticipate power demand changes of light source 304 due to, for example, dimming The PFC system controller 1004 is configured to provide a specific output voltage link voltage $V_{C1}$ for a specific dimming level. In at least one embodiment, the controller 1004 responds to comparison signal $V_{comp}$, which indicates a change in requested dimming level and, thus, a change in power demand by light source 304 by proportionately changing the pulse width of LED current control switch signal $CS_2$. In at least one embodiment, the dimmer signal Dv is provided directly to controller 1004 as shown by the dashed line 1008. However, providing dimmer signal Dv to controller 1004 may require an extra pin for controller 1002, which generally adds cost to controller 1002. Using feed forward control, the controller 1002 can concurrently modify power demand by the power factor correction control system 1004 and modify power supplied by the switching LED system controller 1006. The term "concurrently" includes short delays due to, for example, processing by controller 1006.

In accordance with changes in a dimming level indicated by the dimmer signal $D_V$, in at least one embodiment, the PFC system controller 1004 includes a proportional integrator (PI) compensator 1010 that receives a feedback signal link voltage $V_{C1}$ representing the link voltage $V_{C1}$ and generates an output signal using a PI transfer function, such as the PI transfer function and system of Melanson IV. However, because the dimmer signal $D_V$ anticipates power demand by light source 304, the PFC controller 1004 can concurrently respond to dimming level changes and, the PI compensator 1010, in at least one embodiment, only makes power demand adjustments of, for example, 10% of the total power delivered by the power and control system 1000. Responding more rapidly to power demand changes in light source 304 allows switching power converter 402 to utilize a smaller capacitor value, such as 4.7 μF for capacitor 408 because increases of link voltage $V_{C1}$ are reduced to within the operating characteristics of ceramic, polypropylene, and other capacitors that have advantageous properties relative to electrolytic capacitors such as better temperature characteristics because light source 304 tends to generate higher temperatures better suited for ceramic, polypropylene, and other higher temperature capacitors. In at least one embodiment, controller 1004 generates PFC control signal $CS_1$ in the same manner as controller 305 so that the changes in the dimming level indicated by dimmer signal $D_V$ are commensurate with changes to the power ($V_{C1} \cdot i_{in}$) delivered by switching power converter 402 while maintaining an approximately constant link voltage $V_{C1}$.

Figure 11:
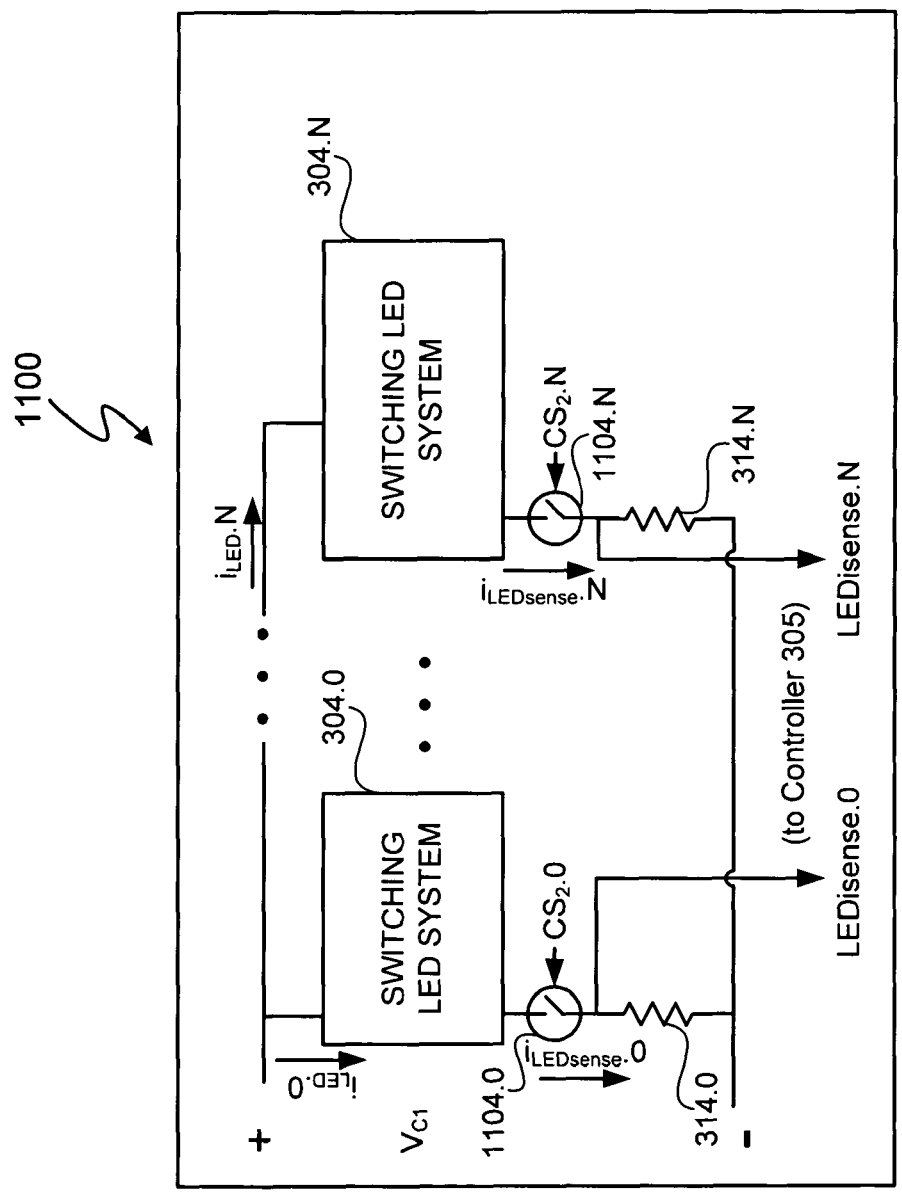
FIG. 11 depicts a switching LED system with multiple current sense elements.

FIG. 11 depicts a switching light source bank 1100 having N+1 switching LED systems, where N is an integer greater than or equal to 1. Switching LED system bank 1100 is a substitution for switching LED system 304. In at least one embodiment, each light source 304.x is a light source such as switching LED system 304, where x denotes the $x^{th}$ light source and is, for example, an integer and a member of the set {0, . . . , N}. Each of the N+1 light sources includes at least one LED and the number and color of each LED for each light source is a matter of design choice. Each light source 304.x is connected to a respective switch 1104.x, and each switch 1104.x is an n-channel FET. In at least one embodiment, controller 305 independently controls each light source 304.x by generating respective control signals $CS_2.0, \ldots, CS_2.N$ to control the conductivity of switches 1104.0, . . . , 1104N. The average values of the drive currents $i_{LED}.0, \ldots, i_{LED}.N$ control the respective intensity of LED(s) of switching LED systems 304.0, . . . , 304.N. Switching LED systems 304.0, . . . , 304.N are connected to respective current sense elements 314.0, . . . , 314.N.

The current sense elements 314.0, . . . , 314.N can be different or identical. Each current sense element 314.x provides a feedback signal LEDsense.x to controller 305. In at least one embodiment, controller 305 generates each control signal $CS_{2x}$ in the same manner as the generation of LED current control switch signal $CS_2$ (FIG. 4). The output signals of $LEDi_{sense}.0, \ldots, LEDi_{sense}.N$ are fed back to controller 305 to allow controller 305 to adjust the switching frequency of switches 1104.0, . . . , 1104.N and, thus, correlate LED drive currents $i_{LED}.0, \ldots, i_{LED}.N$ with a desired intensity of the LED(s) of light sources 304.0, . . . , 304.N. In at least one embodiment, the desired intensity is a dimming level indicated by dimmer signal $D_V$. The type, number, and arrangement of LED(s) in switching LED systems 304.0, . . . , 304.N is a matter of design choice and depends, for example, on the range of desired intensity and color temperatures of switching LED systems 304.0, . . . , 304.N.

Figure 12:
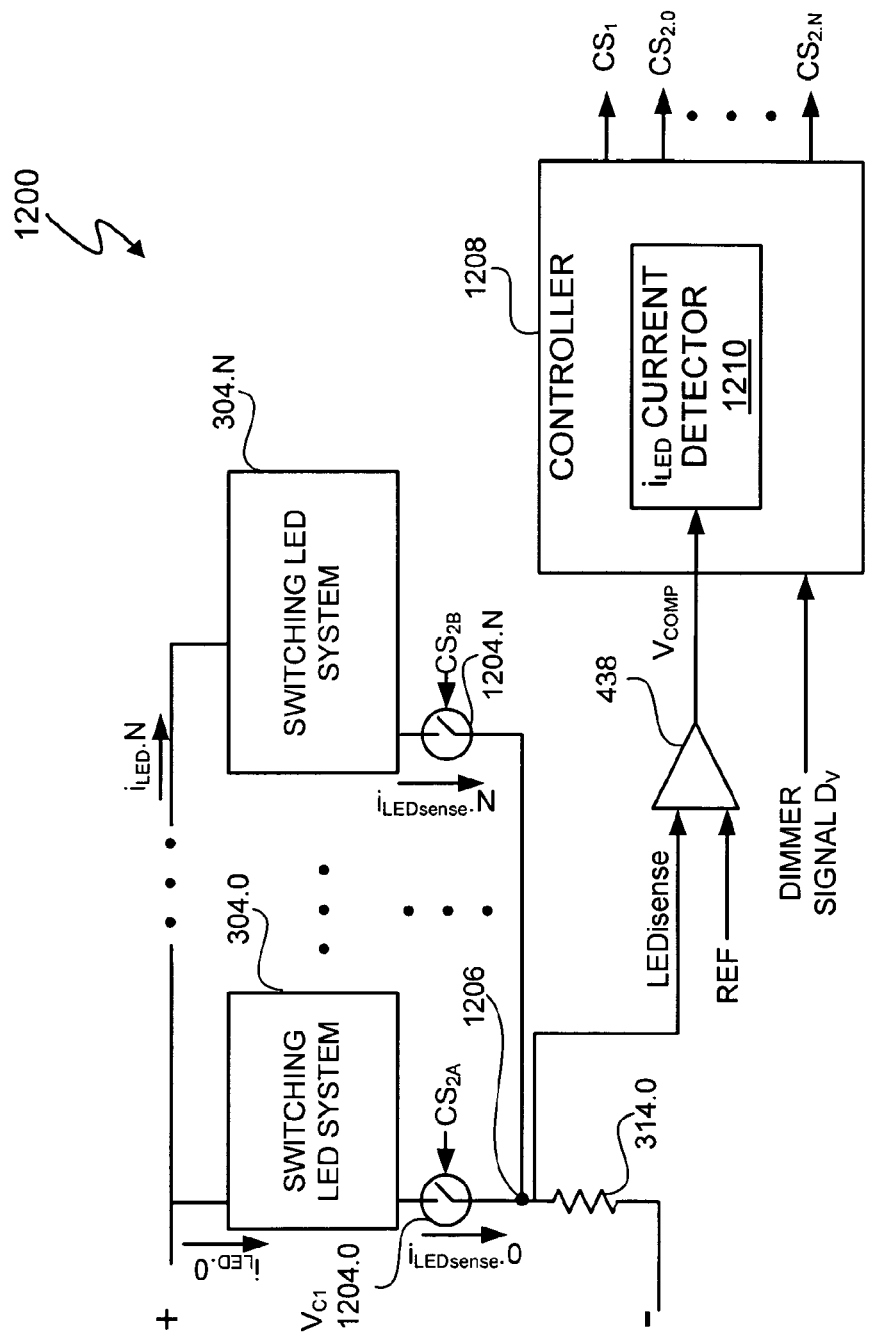
FIG. 12 depicts a switching LED system with a single current sense element.

FIG. 12 depicts a switching LED system bank 1200, which represents a substitution for switching LED system 304 (FIG. 4). One current sense element 312 provides a feedback signal $LEDi_{sense}$ that represents the LED sense currents of all switching LED systems 304.0, . . . , 304.N to sense each of the LED sense currents $i_{LEDsense}.0, \ldots, i_{LEDsense}.N$ for respective switching LED systems 304.0, ..., 304.N. Each of the switches 1204.0, ..., 1204.N have a common current node 1206. At the common current node 1206, all of the LED sense currents $i_{LEDsence}.0, \ldots, i_{LEDsense}.N$ are combined, and the feedback signal $LEDi_{sense}$ from current sense device 312 represents the combination of all of the LED sense currents $i_{LEDsense}.0, \ldots, i_{LEDsense}.N$. In at least one embodiment, feedback signal $LEDi_{sense} = 1/x \cdot (i_{LEDsense}.0 + i_{LEDsense}.1 +, \ldots, + i_{LEDsense}.N)$, where "x" is a scaling factor of current sense device 312. Utilizing a common sense element 312 reduces a number of pins for an integrated circuit implementation of controller 1208, which reduces the cost of controller 1208. Controller 1208 represents one embodiment of controller 305.

Figure 13:
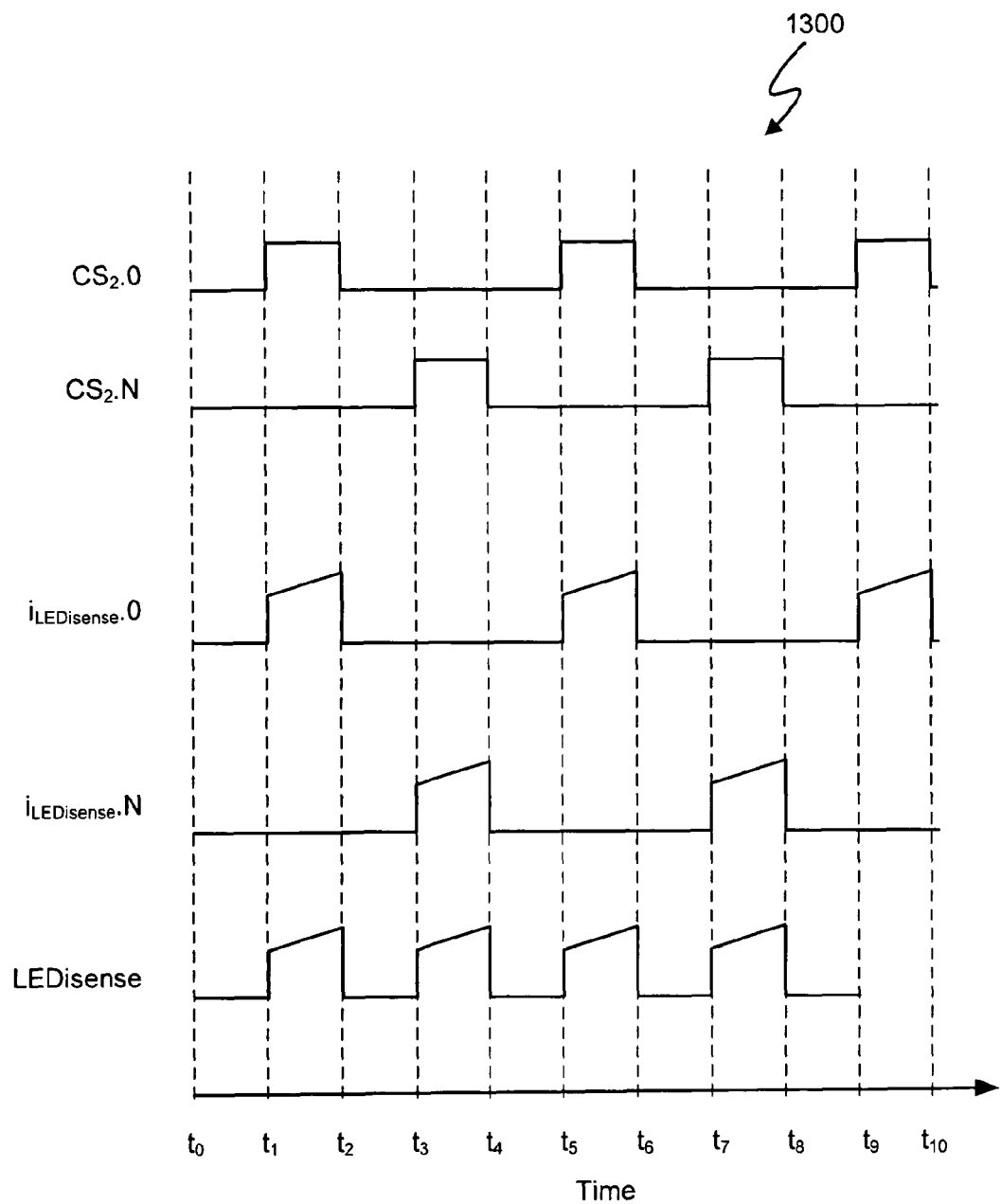
FIG. 13 depicts a graphical representation of non-overlapping control signals and current sense signals.

FIG. 13 depicts a graphical representation 1300 of non-overlapping control signals and current sense signals. The operation of LED source bank 1200 and controller 1208 (FIG. 12) are described in conduction with the signals of FIG. 13. Control signals $CS_2.0$ and $CS_2.N$ represent two exemplary control signals for control signals $CS_2.0, \ldots, CS_2.N$. Control signals $CS_2.0$ and $CS_2.N$ are depicted with a duty cycle of 0.25, i.e. pulse width/period, and non-overlapping pulse widths. During each pulse of control signals $CS_2.0$ and $CS_2.N$, respective currents $i_{LEDsense}.0$ and $i_{LEDsense}.N$ flow through respective switches 1204.0 and 1204.N and are combined into the single $LEDi_{sense}$ feedback signal from current sense device 312.

Referring to FIGS. 12 and 13, controller 1208 includes an LED current detector 1210 that detects and determines the individual LED currents $i_{LED}$ in switching LED systems 304.0, ..., 304.N from the $LEDi_{sense}$ feedback signal. The location in time of each contribution of currents $i_{LEDsense}.0$ and $i_{LEDsense}.N$ in the feedback signal $LEDi_{sense}$ corresponds to the respective pulses of controls signals $CS_2.0$ and $CS_2.N$.

In at least one embodiment, in a dimmable configuration, dimmer signal $D_V$ is used to indicate a dimming level for switching LED systems 304.0, ..., 304.N. Comparator 438 compares the $LEDi_{Sense}$ feedback signal to the dimmer signal $D_V$. Variations in the comparator output signal $V_{comp}$ occur at approximately the same time as the contribution of currents $i_{LEDsense}.0$ and $i_{LEDsence}.N$ to the feedback signal $LEDi_{sense}$. Since controller 1208 generates control signals $CS_2.0$ and $CS_2.N$, the times at which currents $i_{LEDsense}.0$ and $i_{LEDsense}.N$ will vary the comparator output signal $V_{comp}$ are also known by LED current detector 1210. By knowing which changes in comparator output signal $V_{comp}$ correspond to each particular current of switching LED systems 304.0, ..., 304.N, controller 1208 can adjust each LED current control switch signal $CS_2.0$ and $CS_2.N$ in response to the dimmer signal $D_V$ to dim the LEDs of switching LED systems 304.0 and 304.N to the dimming level indicated by dimmer signal $D_V$. In at least one embodiment, controller 1208 generates each LED current control switch signal $CS_2.0, \ldots, CS_2.N$ in any manner described in conjunction with controller 305.

In at least one embodiment, the switching LED systems 304.0, ..., 304.N are not dimmed In this embodiment, LED current detector 1210 receives the feedback signal $LEDi_{sense}$ directly. Since controller 1208 generates control signals $CS_2.0$ and $CS_2.N$, the times at which currents $i_{LEDsense}.0$ and $i_{LEDsense}.N$, LED current detector 1210 detects the contribution of currents $i_{LEDsense}.0$ and $i_{LEDsense}.N$ during any of the respective times during which respective control signals $CS_2.0$ and $CS_2.N$ are non-overlapping.

Figure 14:
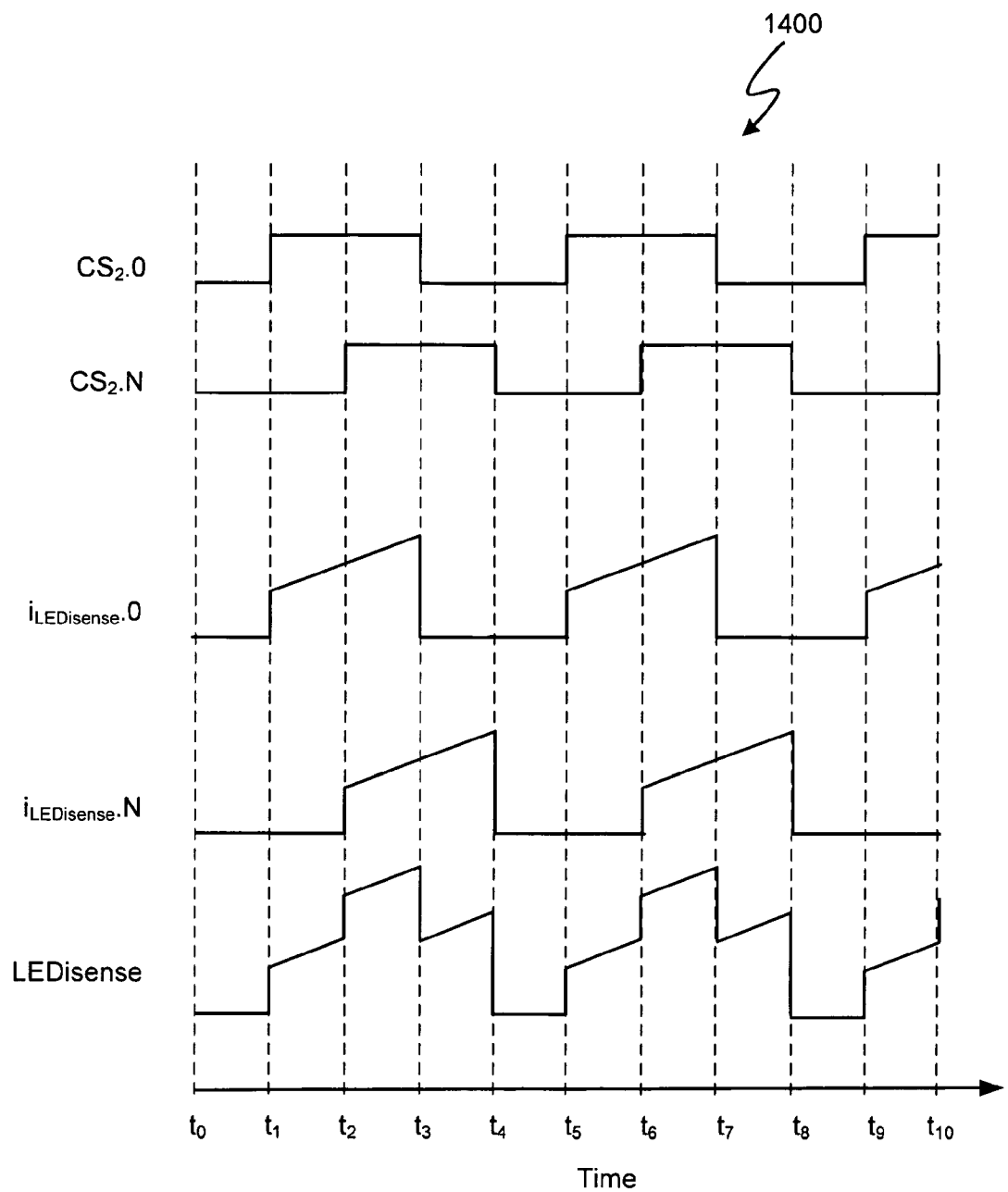
FIG. 14 depicts a graphical representation of overlapping control signals and current sense signals.

FIG. 14 depicts a graphical representation 1400 of overlapping control signals and current sense signals for processing by controller 1208 to generate multiple control signals for multiple light sources from a single feedback signal $LEDi_{sense}$. The overlapping control signals each have a duty cycle of 0.5. LED current detector 1210 detects the contributions of currents $i_{LEDsense}.0$ and $i_{LEDsense}.N$ in feedback signal $LEDi_{sense}$ or comparator output signal $V_{comp}$ at times when the control signals $CS_2.0$ and $CS_2.N$ are non-overlapping. For example, LED current detector 1210 detects the contribution of $i_{LEDsense}.0$ during times $t_1$ to $t_2$, $t_5$ to $t_6$, $t_9$ to $t_{10}$, and so on. Likewise, LED current detector detects the contribution of $i_{LEDsense}.N$ during times $t_3$ to $t_4$, $t_7$ to $t_8$, and so on.

Figure 15:
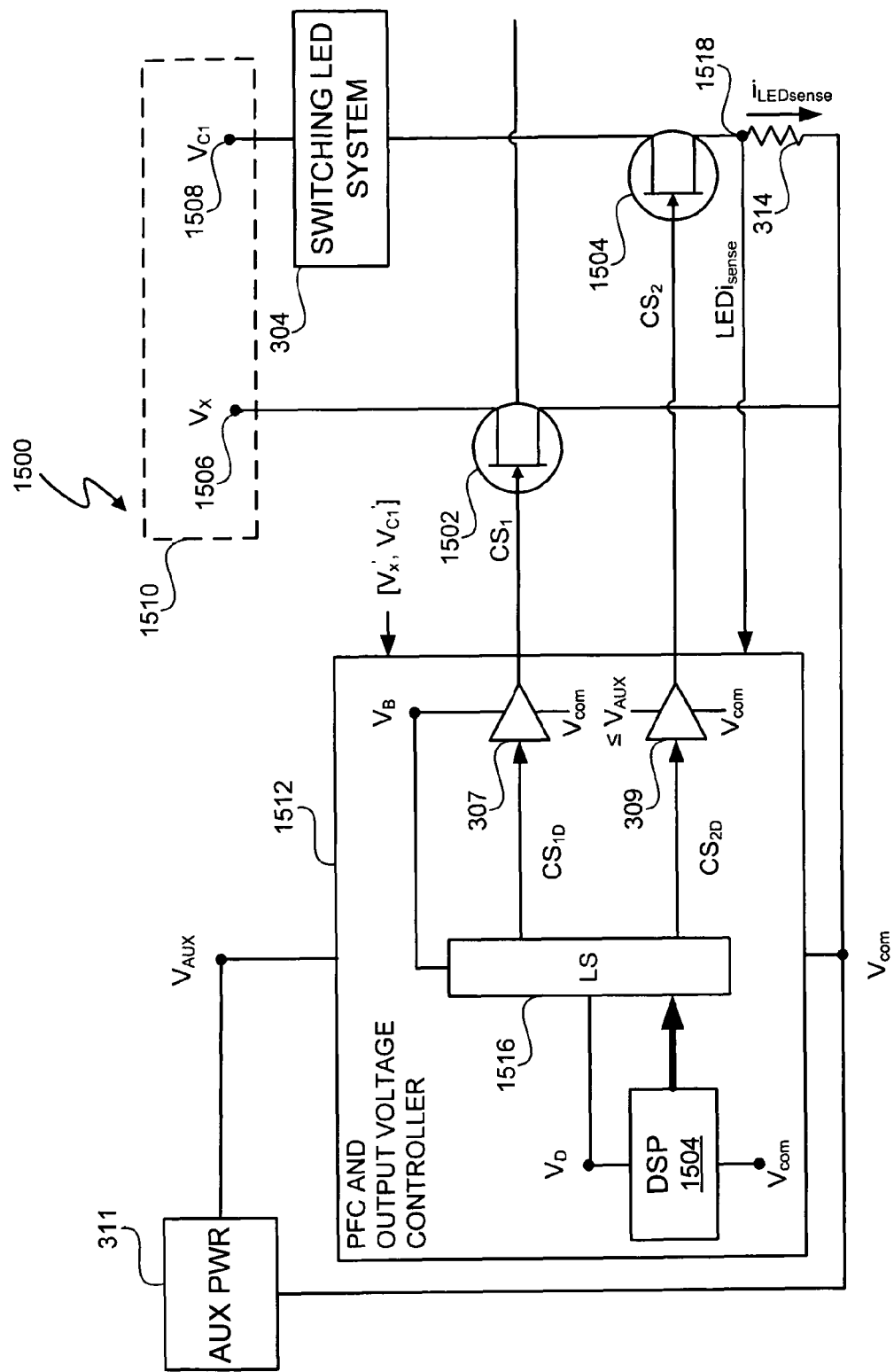
FIG. 15 depicts an embodiment of a controller of the lighting system of FIG. 3.

FIG. 15 depicts lighting system 1500, which is one embodiment of lighting system 300. Lighting system 1500 includes PFC switch 1502, which is an n-channel FET and represents one embodiment of switch 308. PFC switch 1502 operates between the primary supply voltage $V_x$ and the common reference voltage $V_{com}$. PFC switch 1502 does not have to be connected directly to the primary supply voltage $V_x$. In at least one embodiment, PFC switch 1502 is coupled through other components (not shown) to a primary supply voltage node 1506 conducting primary supply voltage $V_x$. Lighting system 1500 also includes LED drive current control switch 1504, which is an n-channel FET and represents one embodiment of switch 310. LED drive current control switch 1504 is coupled through switching LED system 304 to link voltage node 1508. LED drive current control switch 1504 operates between the link voltage $V_x$ and the common reference voltage $V_{com}$. Voltages $V_x$ and $V_{C1}$ are both switching power converter voltages and are collectively referred to as "high" supply voltages 1510 because they represent the highest voltages in the lighting system 1500. Nodes 1506 and 1508 are referred to as high voltage source nodes. PFC switch 1502 is, thus, referred to as a high voltage PFC switch, and LED current control switch 1504 is, thus, referred to as a high voltage LED current control switch. In at least one embodiment, the root mean square (RMS) of high supply voltages 1510 is greater than or equal to 100 V.

The lighting system 1500 also includes PFC and output voltage controller 1512, which in at least one embodiment is identical to controller 305. PFC and output voltage controller 1512 operates from at least two different voltages, which are lower than the high voltages 1510. Output buffers 307 and 309 operate between voltages $V_B$ and the common reference voltage. Voltage $V_B$ is less than or equal to auxiliary voltage $V_{AUX}$ and greater than or equal the digital voltage reference $V_D$. The voltage $V_B$ is set to be sufficient to drive the gates of switches 1502 and 1504 and, thus, control the conductivity of switches 1502 and 1504. Voltage $V_B$ is referred to as a "medium level" supply voltage. In at least one embodiment, the medium level supply voltage is in the range of 8 V to 50 V.

The lighting system 1500 also includes a digital signal processor (DSP) 1514 to generate PFC control signal $CS_{1D}$ and LED current control signal $CS_{2D}$. The DSP 1514 is coupled to an LED feedback node 1518. DSP 1514 operates between a digital supply voltage $V_D$ and the common reference voltage $V_{com}$. The digital supply voltage $V_D$ is sufficient to operate the digital components of DSP 1504 and is, for example, in the range of 3 V to 8 V. A level shifter (LS) 1516 level shifts the digital PFC control signal $CS_{1D}$ and digital LED current control signal $CS_{2D}$ from DSP 1504 to a level sufficient to control the conductivity of respective buffers 307 and 309. The digital supply voltage $V_D$ can be a stepped down version of the auxiliary voltage $V_{AUX}$ generated internally by controller 1512.

Thus, although the controller 1512 operates from a digital voltage $V_D$, and an auxiliary voltage $V_{AUX}$ and the switches operates from high voltages 1510, the lighting system 1500 has a common reference voltage $V_{com}$ to allow all the components of lighting system 1500 to work together. By operating from auxiliary voltage $V_{AUX}$, the controller 1512 can be fabricated using lower cost fabrication techniques than a controller operating from the high voltages 1510.

Thus, in at least one embodiment, a LED lighting system controller operates from a supply voltage $V_{AUX}$ less than a link voltage $V_{C1}$ generated by the LED lighting power system relative to a common reference voltage at a common reference node. By utilizing a lower voltage, in at least one embodiment, the controller can be manufactured at a lower cost than a comparable controller supplied by the primary power supply utilized by the LED lighting power system. Additionally, during normal operation of the LED lighting system, a power factor correction (PFC) switch and an LED drive current switch of the LED lighting system, that respectively control power factor correction and LED drive current, are coupled to the common reference node and have control node-to-common node, absolute voltage that allows the controller to control the conductivity of the switches. In at least one embodiment, the PFC switch and the LED drive current switch each have a control node-to-common node, absolute voltage within 15% of an absolute value of the link voltage relative to the common reference voltage. In at least one embodiment, the LED lighting system utilizes feed forward control to concurrently modify power demand by the LED lighting power system and power demand of one or more switching LED systems. In at least one embodiment, the LED lighting system utilizes a common current sense device to provide a common feedback signal to the controller representing current in at least two of the switching LED systems.

Although the present invention has been described in detail, it should be understood that various changes, substitutions and alterations can be made hereto without departing from the spirit and scope of the invention as defined by the appended claims.

What is claimed is:
1. An apparatus comprising:
 a power factor correction (PFC) and light emitting diode (LED) drive controller, the controller comprising:
  a signal processor, coupled to the LED feedback node and configured to:
   operate from a first level supply voltage;
   generate a PFC control signal; and
   generate an LED current control signal;
  a first buffer, coupled to the processor, and configured to:
   operate from a second level supply voltage, wherein the second level supply voltage is greater than the first level supply voltage;
   receive the PFC control signal; and
   convert the PFC control signal into a PFC switch control signal to control conductivity of a PFC switch; and
  a second buffer, coupled to the processor, and configured to:
   operate from the second level supply voltage;
   receive the LED current control signal; and
   convert the LED current control signal into an LED current control switch signal to control conductivity of an LED current control switch.
2. The apparatus of claim 1 wherein the first level supply voltage is a digital level supply voltage.
3. The apparatus of claim 1 wherein the controller is configured to generate multiple control signals to respectively control multiple switching LED systems.
4. The apparatus of claim 1 wherein the controller is configured to internally generate the first level supply voltage from the second level supply voltage.

5. The apparatus of claim 1 further comprising a plurality of LEDs, wherein, during operation of the controller, the LED current control switch controls current through the plurality of LEDs.
6. The apparatus of claim 1 wherein the PFC switch is a high voltage PFC switch, and the LED current control switch is a high voltage LED current control switch.
7. The apparatus of claim 1 wherein the controller is an integrated circuit, and the signal processor comprises a digital signal processor.
8. The apparatus of claim 1 wherein the controller includes at least one input to receive a dimming signal representing a dimming level from a dimmer and wherein the second buffer is further configured to:
 convert the LED current control signal into an LED current control signal to control one or more LEDs in accordance with the dimming level from the dimmer.
9. The apparatus of claim 8 wherein the dimming signal representing the dimming level represents a mapping of a signal generated by the dimmer to a predetermined value different than the dimming level from the dimmer.
10. The apparatus of claim 8 wherein one or more of the switching LED systems includes multiple LEDs.
11. The apparatus of claim 1 further comprising:
 a switching power converter coupled to the PFC and LED drive controller;
 a primary power supply, coupled to the signal processor, to supply a primary supply voltage to the switching power converter; and
 an auxiliary power supply, coupled to the controller, to supply the first level supply voltage to the controller, wherein the first level supply voltage is less than the primary supply voltage.
12. The apparatus of claim 11 wherein the first level supply voltage comprises a voltage generated from the medium level supply voltage.
13. The apparatus of claim 1 further comprising:
 a dimmer coupled to the controller, wherein the dimmer is configured to generate a dimmer signal representing a dimming level and the controller is configured to receive a signal representing the dimming level.
14. The apparatus of claim 13 wherein the first level supply voltage is a stepped down version of the second level supply voltage, and the controller is configured to internally generate the first level supply voltage from the second level supply voltage.
15. A method comprising:
 operating a signal processor of a power factor correction (PFC) and output voltage controller from a first level supply voltage;
 generating a PFC control signal; and
 generating an LED current control signal;
 operating a first buffer, coupled to the processor, from a second level supply voltage, wherein the second level supply voltage is greater than the first level supply voltage;
 receiving the PFC control signal;
 converting the PFC control signal into a PFC switch control signal to control conductivity of a PFC switch; and
 operating a second buffer, coupled to the processor, from the second level supply voltage;
 receiving the LED current control signal; and
 converting the LED current control signal into an LED current control switch signal to control conductivity of an LED current control switch.
16. The method of claim 15 wherein the first level supply voltage is a digital level supply voltage.

17. The method of claim of 15 further comprising:
generating the first level supply voltage from the second level supply voltage internally by the controller.

18. The method of claim 15 further comprising:
controlling current in a plurality of LEDs.

19. The method of claim 15 wherein the PFC switch is a high voltage PFC switch, and the LED current control switch is a high voltage LED current control switch.

20. The method of claim 15 wherein the controller includes an LED feedback node to receive an LED current feedback signal representing one or more current levels in one or more switching LED systems and a voltage feedback node to receive an input voltage feedback signal representing an input voltage level provided to a lighting system that includes the controller, the method further comprising:
generating the PFC control signal in response to the input voltage level represented by the input voltage feedback signal; and
generating the LED drive current control signal in response to the one or more current levels represented by the LED current feedback signal.

21. The method of claim 15 wherein the first supply voltage has an absolute value less than or equal to 8 volts, the second level supply voltage has an absolute value less than or equal to 50 volts, and the high voltage PFC switch is coupled between voltage nodes having a voltage difference during normal operation of a lighting system that includes the controller of at least 100 volts, and the high voltage LED drive current switch is coupled between voltage nodes having a voltage difference during normal operation of the lighting system of at least 100 volts.

22. The method of claim 15 further comprising:
supplying a primary supply voltage to a switching power converter; and
supplying the first level supply voltage to the controller, wherein the first level supply voltage is less than the primary supply voltage.

23. The method of claim 22 wherein the first level supply voltage comprises a voltage generated from the medium level supply voltage.

24. The method of claim 15 further comprising:
generating multiple control signals to respectively control multiple switching LED systems.

25. The method of claim 24 wherein one or more of the switching LED systems includes multiple LEDs.

26. The method of claim 15 further comprising:
generating the first level supply voltage from the second level supply voltage.

27. The method of claim of 26 wherein generating the first level supply voltage from the second level supply voltage comprises:
stepping down the second level supply voltage internally by the controller to generate the first level supply voltage.

28. The method of claim 15 further comprising:
receiving a dimming signal representing a dimming level from a dimmer; and
dimming one or more LEDs in accordance with the dimming level.

29. The method of claim 28 further comprising:
mapping a dimmer signal generated by a dimmer to a predetermined value different than the dimming level from the dimmer to generate the dimming signal.

30. The method of claim 28 wherein dimming one or more LEDs in accordance with the dimming level comprises:
operating the second buffer to convert the LED current control signal into an LED current control signal to control one or more LEDs in accordance with the dimming level from the dimmer.

31. The method of claim 28 further comprising:
generating a dimmer signal representing the dimming level.

32. The method of claim 15 further comprising:
generating a first voltage, wherein the first voltage is a link voltage;
operating a switching power converter of an LED lighting power system from the first source voltage relative to a common voltage, wherein the switching power converter includes the PFC switch;
operating the PFC switch at a control node-to-common node, absolute voltage to allow the PFC and output voltage controller to control the PFC switch and provide power factor correction for the switching power converter;
operating the LED current control switch at a control node-to-common node, absolute voltage to allow the PFC and output voltage controller to control the LED current control switch to supply an approximately constant current to an LED switching system for each dimming level indicated by a dimmer signal; and
controlling conductivity of the PFC switch and the LED current control switch with the PFC and output voltage controller.

33. The method of claim 32 wherein:
operating the PFC switch of the switching power converter at a control node-to-common node, absolute voltage to allow a PFC and output voltage controller to control the PFC switch and provide power factor correction for the switching power converter comprises operating the PFC switch of the LED lighting power system at a control node-to-common node, absolute voltage less than or equal to 0.15 times the first source voltage relative to the common voltage reference; and
operating the LED current control switch at a control node-to-common node, absolute voltage to allow the PFC and output voltage controller to control the LED current control switch to supply an approximately constant current to an LED switching system for each dimming level indicated by a dimmer signal comprises operating the LED current control switch at a control node-to-common node, absolute voltage less than or equal to 0.15 times the first source voltage relative to the common voltage reference.

34. The method of claim 32 wherein the PFC and LED current control switches comprise field effect transistors and controlling conductivity of the PFC switch and LED current control switch with the PFC and output voltage controller comprises providing respective duty cycle modified control signals to gates of the PFC switch and LED current control switch.

35. The method of claim 32 further comprising:
receiving a rectified primary supply voltage, wherein a root mean square (RMS) value of the primary supply voltage is greater than the second level voltage;
boosting the primary supply voltage to the first source voltage, wherein boosting the primary supply voltage further comprises modulating the conductivity of the PFC switch to generate a power factor corrected first source voltage.

36. The method of claim 32 further comprising:
receiving a dimmer signal; and
controlling conductivity of the PFC switch and the LED current control switch further comprises:

concurrently controlling the conductivity of the PFC switch and the LED current control switch to modify power demand by LED lighting power system and modify power supplied by a lighting system coupled to the controller in accordance with changes in a dimming level indicated by the dimmer signal.

37. The method of claim 32 wherein the second source voltage is less than or equal to approximately 15% of the first source voltage.

38. The method of claim 32 further comprising:
operating one or more transistors of the PFC and output voltage controller from a third voltage source node and the common voltage reference, wherein the third voltage is lower than the link voltage and the second source voltage.

39. The method of claim 32 wherein a switching LED system includes the LED and controlling conductivity of the LED current control switch further comprises:
receiving a feedback signal from a switching LED system; and
responding to the feedback signal to maintain a predetermined current to each LED.

40. The method of claim 39 further comprising:
sensing a voltage across a resistor representing a current through each LED, wherein the voltage sensed across the resistor is the feedback signal.

41. The method of claim 32 further comprising:
operating additional LED current control switches at respective current node voltages less than or equal to 0.15 times the first source voltage relative to the common voltage reference, wherein each LED current control switch controls current through a respective chain of LEDs and each chain of LEDs includes at least one LED;
receiving a single feedback signal representing current conducted by each LED current control switch; and
controlling conductivity of each LED current control switch with the PFC and output voltage controller in response to the feedback signal.

42. The method of claim 41 wherein controlling conductivity of each LED current control switch with the PFC and output voltage controller in response to the feedback signal comprises:
determining during separate periods of time the respective currents conducted by each LED current control switch.

43. The method of claim 32 further comprising:
operating additional LED current control switches at respective current node voltages less than or equal to 0.15 times the first source voltage relative to the common voltage reference, wherein each LED current control switch controls current through a respective chain of LEDs and each chain of LEDs includes at least one LED;
receiving feedback signals, wherein each feedback signal represents a respective current conducted by one of the LED current control switches; and
controlling conductivity of each LED current control switch with the PFC and output voltage controller in response to the feedback signal.

44. A light emitting diode (LED) lighting system comprising:
an LED lighting power system, wherein during normal operation of the LED lighting system the LED lighting power system generates a first source voltage relative to a common voltage reference, wherein the first source voltage is a link voltage, and the LED lighting power system includes:
an auxiliary power supply to supply an auxiliary supply voltage;
a switching power supply having a power factor correction (PFC) switch, wherein during normal operation of the LED lighting system, the PFC switch of the LED lighting power system operates at a current node voltage less than or equal to 0.1 times the first source voltage relative to the common voltage reference; and
an LED current control switch, wherein during normal operation of the LED lighting system, the LED current control switch operates at a current node voltage less than or equal to 0.1 times the first source voltage relative to the common voltage reference;
a dimmer coupled to the LED lighting power system to generate a dimming signal;
a PFC and output voltage, integrated circuit controller coupled to conductivity control nodes of the first and LED drive current switches and to the dimmer, wherein during normal operation of the lighting control system, the controller operates from the auxiliary supply voltage relative to the common voltage and controls conductivity of the PFC switch and the LED current control in accordance with the dimming signal; and
at least one LED coupled to the LED current control switch.

* * * * *